(12) United States Patent
Li et al.

(10) Patent No.: US 10,298,930 B2
(45) Date of Patent: May 21, 2019

(54) CONTEXTS FOR LARGE CODING TREE UNITS

(71) Applicant: QUALCOMM Incorporated, San Diego, CA (US)

(72) Inventors: Xiang Li, San Diego, CA (US); Li Zhang, San Diego, CA (US); Jianle Chen, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/942,035

(22) Filed: Mar. 30, 2018

(65) Prior Publication Data

US 2018/0227580 A1    Aug. 9, 2018

Related U.S. Application Data

(63) Continuation of application No. 15/007,060, filed on Jan. 26, 2016, now Pat. No. 9,936,201.

(60) Provisional application No. 62/108,465, filed on Jan. 27, 2015.

(51) Int. Cl.
  *H04N 19/13*    (2014.01)
  *H04N 19/96*    (2014.01)
  (Continued)

(52) U.S. Cl.
  CPC .......... *H04N 19/13* (2014.11); *H04N 19/119* (2014.11); *H04N 19/196* (2014.11); *H04N 19/96* (2014.11)

(58) Field of Classification Search
  None
  See application file for complete search history.

(56) References Cited

U.S. PATENT DOCUMENTS

| 8,483,282 B2 | 7/2013 | Karczewicz et al. |
| 8,995,523 B2 | 3/2015 | Chien et al. |

(Continued)

FOREIGN PATENT DOCUMENTS

| CN | 101822065 A | 9/2010 |
| JP | 2004328498 A | 11/2004 |

(Continued)

OTHER PUBLICATIONS

Lou Jian et al., "Parallel processing friendly context modeling for significance map coding in CABAC", 4. JCT-VC Meeting, 95. MPEG Meeting, Jan. 20, 2011-Jan. 28, 2011, Daegu, KR (Joint Collaborative Team on Video Coding of ISO/IEC JTC1/SC29/WG11 and ITU-T SG.16, URL: http://wftp3.itu.int/av-arch/jc tvc-site/, No. JCTVC-D241, Jan. 19, 2011 (Jan. 19, 2011), XP030008281, ISSN: 0000-0013 the whole document.

(Continued)

*Primary Examiner* — Obafemi O Sosanya
(74) *Attorney, Agent, or Firm* — Shumaker & Sieffert, P.A.

(57) ABSTRACT

In an example, a method of coding video data may include selecting, as part of an entropy coding process, a context for a syntax element associated with a current coding unit (CU) based on information relating to CU depth of one or more neighboring CUs relative to the current CU. The syntax element may represent whether the current CU is split into sub-CUs. The method may include entropy coding the syntax element based on the selected context.

19 Claims, 6 Drawing Sheets

(51) Int. Cl.
*H04N 19/119* (2014.01)
*H04N 19/196* (2014.01)

(56) References Cited

U.S. PATENT DOCUMENTS

| | | | |
|---|---|---|---|
| 9,300,957 | B2 | 3/2016 | Cheon et al. |
| 9,936,201 | B2 | 4/2018 | Li et al. |
| 2005/0276323 | A1 | 12/2005 | Martemyanov et al. |
| 2006/0193388 | A1 | 8/2006 | Woods et al. |
| 2006/0232454 | A1 | 10/2006 | Cha et al. |
| 2008/0219578 | A1 | 9/2008 | Lee |
| 2010/0322287 | A1 | 12/2010 | Truong et al. |
| 2011/0097998 | A1 | 4/2011 | Ko et al. |
| 2011/0135000 | A1 | 6/2011 | Alshina et al. |
| 2011/0164677 | A1 | 7/2011 | Lu et al. |
| 2011/0243226 | A1 | 10/2011 | Choi et al. |
| 2012/0121011 | A1 | 5/2012 | Coban et al. |
| 2012/0328010 | A1 | 12/2012 | Sasai et al. |
| 2013/0279577 | A1* | 10/2013 | Schwarz ............... H04N 19/50 375/240.12 |
| 2014/0126645 | A1* | 5/2014 | Lim ..................... H04N 19/105 375/240.16 |
| 2014/0219335 | A1 | 8/2014 | Lee et al. |
| 2014/0269928 | A1* | 9/2014 | Piao ....................... H04N 19/91 375/240.18 |
| 2015/0022633 | A1* | 1/2015 | Zhang ................. H04N 19/597 348/43 |

FOREIGN PATENT DOCUMENTS

| | | |
|---|---|---|
| JP | 2008167149 A | 7/2008 |
| JP | 2010524346 A | 7/2010 |
| JP | 2013539313 A | 10/2013 |
| JP | 2014515894 A | 7/2014 |
| WO | WO-2008124434 A1 | 10/2008 |
| WO | WO-2009049260 | 4/2009 |
| WO | WO-2009119888 A1 | 10/2009 |
| WO | WO-2010063184 A1 | 6/2010 |
| WO | 2012059577 A1 | 5/2012 |
| WO | WO-2012068021 A1 | 5/2012 |
| WO | 2012176463 A1 | 12/2012 |
| WO | 2013005968 A2 | 1/2013 |
| WO | 2013066051 A1 | 5/2013 |

OTHER PUBLICATIONS

"3rd Generation Partnership Project; Technical Specification Group Radio Access Network; Evolved Universal Terrestrial Radio Access (E-UTRA); Study on signaling and procedure for interference avoidance for in-device coexistence (Release 11)", 3GPP Standard; 3GPP TR 36.816, 3rd Generation Partnership Project (3GPP), Mobile Competence Centre ; 650, Route Des Lucioles ; F-06921 Sophia-Antipolis Cedex, France, a vol. RAN WG2, No. V11.0.0, Jun. 24, 2011 (Jun. 24, 2011), 42 pp., XP050553600, [retrieved on Jun. 24, 2011].
International Search Report and Written Opinion dated Mar. 30, 2016, from International Application No. PCT/US2016/015034.
Bluetooth, "Specification of the Bluetooth System", Covered Core Package version: 4.0, Jun. 30, 2010, vol. (0-6), pp. 1-2302.
Bossen F., "Common Test Conditions and Software Reference Configurations", Joint Collaborative Team on Video Coding (JCT-VC) of ITU-T SG16 WP3 and ISO/IEC JTC1/SC29/WG11, 12th Meeting: Geneva, CH Jan. 14-23, 2013, JCTVC-L1100, 4 Pages.
Bross B., et al., "High Efficiency Video Coding (HEVC) text specification draft 10 (for FDIS & Consent)," Joint Collaborative Team on Video Coding (JCT-VC) of ITU-T SG 16 WP 3 and ISO/IEC JTC 1/SC 29/WG 11, Document: JCTVC-L1003_v34, 12th Meeting: Geneva, CH, Jan. 14-23, 2013, 310 pages.
Bross, B., et al., "High efficiency video coding (HEVC) text specification draft 7," Joint Collaborative Team on Video Coding (JCT-VC) of ITU-T SG16 WP3 and ISO/IEC JTC1/SC29/WG11 9th Meeting: Geneva, CH, Apr. 27, 2012-May 7, 2012, JCTVC-I1003_d2, XP030112373, (May 10, 2012), pp. 1-290.
Bross B., et al., "High Efficiency Video Coding (HEVC) text specification draft 8", 10. JCT-VC Meeting; 101. MPEG Meeting; Nov. 7, 2012-Jul. 20, 2012; Stockholm; SE (Joint Collaborative Team on Video Coding of ISO/IEC JTC1/SC29/WG11 and ITU-T SG.16); URL: http://wftp3.itu.int/av-arch/jctvc-site/,, No. JCTVC-J1003_d7, Jul. 23, 2012 (Jul. 23, 2012), XP030112947, 260 Pages.
Bross, et al., "WD4: Working Draft 4 of High-Efficiency Video Coding," JCTVC-F803_d2, (JCT-VC) of ITU-T SG16 WP3 and ISO/IEC JTC1/SC29/WG11 Joint Collaborative Team on Video Coding, 6th Meeting, Torino, IT, Jul. 14-22, 2011, 226 pp.
Bross, et al., "WD5: Working Draft 5 of High-Efficiency Video Coding," JCTVC-G1103_d2, (JCT-VC) of ITU-T SG16 WP3 and ISO/IEC JTC1/SC29/WG11 Joint Collaborative Team on Video Coding, 7th Meeting, Geneva, CE (Nov. 2011), 214 pages.
Chen J., et al., "Simplified Context Model Selection for Block Level Syntax Coding", 6. JCT-VC Meeting; 97. MPEG Meeting; Jul. 14, 2011-Jul. 22, 2011; Torino, IT (Joint Collaborative Team on Video Coding of ISO/IEC JTC1/SC29/WG11 and ITU-TSG.16), 3 Pages, URL: http://wftp3.itu.int/av-arch/jctvc-site/, No. JCTVC-F497, Jul. 2, 2011 (Ju. 2, 2011), XP030009520.
Chien et al., "Memory and Parsing Friendly CABAC Context", 6 JCT-VC Meeting, 97 MPEG Meeting, Jul. 14-Jul. 22, 2011, Torino, IT (Joint Collaborative Team on Video Coding of ISO/IEC JTC1/SC29/WG11 and ITU-T SG.16 ), URL: htip://wftp3.1tu.int/av-arch/jctvc-site/no_ jctvc-F606_2, Jul. 2, 2011, XP030009629, 6 pp.
Chien, et al., "Memory and Parsing Friendly CABAC Context", Joint Collaborative Team on Video Coding, Jul. 14-22, 011 „JCTVC-F606_r2, Jul. 20, 2011, 9 pp.
Chien, W.-J. et. al., "CE12: Adaptive Motion Vector Resolution from Qualcomm", JCTVC-D394, Daegu, KR, Jan. 2011.
Chien W.J., et al., "Context Modeling of Split Flag for CABAC", 7, JCT-VC Meeting; 98, MPEG Meeting; Nov. 21, 2011-Nov. 30, 2011 Geneva, CH (Joint Collaborative Team on Video Coding of ISO/IEC JTC1/SC29/WG11 and ITU-T SG.16), 2 pp.; URL: http://wftp3.itu.int/av-arch/jctvc-site/, No. JCTVC-G829, Nov. 9, 2011 (Nov. 9, 2011), XP030110813.
Chien W-J et al., "Memory and Parsing Friendly CABAC Context", 6 JCT-VC Meeting, 97 MPEG Meeting, Jul. 14, 2011-Jul. 22, 2011, Torino, IT (Joint Collaborative Team on Video Coding of ISO/IEC JTC1/SC29/WG11 and ITU-T SG.16 ), URL: http://wftp3.itu.int/av-arch/jctvc-site/No. JCTVC-F606, Jul. 20, 2011 (Jul. 20, 2011), XP030009629, the whole document.
Chien W.J., et al., "Memory and Parsing Friendly CABAC Context", Joint Collaborative Team on Video Coding, JCTVC-F606_r2, Jul. 14-22, 2011, 16 pp.
Chien W.J., et al.,"Context reduction for CABAC", 7. JCT-VC Meeting; 98. MPEG Meeting;Nov. 21, 2011-Nov. 30, 2011; Geneva, CH (Joint Collaborative Team on Video Coding of ISO/IEC JTC1/SC29/WG11 and ITU-T SG. 16) ; URL: http://wftp3.itu.int/av-arch/jctvc-site/, No. JCTVC-G718, Nov. 9, 2011 (Nov. 9, 2011), XP030110702.
Drugeon V., et.al., "Improvement of inter mode coding and split flags coding for LCEC", 5 pages, Mar. 10, 2011, Joint Collaborative Team on Video Coding (JCT-VC) of ITU-T SG16 WP3 and ISO/IEC JTC1/SC29/WG11, Document: JCTVC-E258.
ITU-T H.263, "Video Coding for Low Bit Rate Communication", Series H: Audiovisual and Multimedia Systems, Infrastructure of audiovisual services—Coding of moving video, Jan. 2005, 226 pages.
ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
ITU-T H.265, Series H: Audiovisual and Multimedia Systems, Infrastructure of audiovisual services—Coding of moving video, High efficiency video coding, The International Telecommunication Union, Apr. 2013, 317 pages.

(56) References Cited

OTHER PUBLICATIONS

ITU-T H.265, Series H: Audiovisual and Multimedia Systems, Infrastructure of audiovisual services—Coding of moving video, High efficiency video coding, The International Telecommunication Union, Apr. 2015, 634 pp.

ITU-T H.265, Series H: Audiovisual and Multimedia Systems, Infrastructure of audiovisual services—Coding of moving video, High efficiency video coding, The International Telecommunication Union, Oct. 2014, 540 pp.

JCTVC-F606—Chien et al., "JCTVC-F606: Memory and Parsing Friendly CABAC Context," Joint Collaborative Team on Video Coding, JCTVC-F606, PowerPoint_1, Jul. 14-22, 2011, 6 slides.

JCTVC-F606_2—Chien et al., "JCTVC-F606: Memory and Parsing Friendly CABAC Context," Joint Collaborative Team on Video Coding, JCTVC-F606, PowerPoint_2, Jul. 14-22, 2011, 6 slides.

Karczewicz M., et al., "CE5: Improved coefficient coding with LCEC," Document: JCTVC-D374, 4th Meeting: Daegu, KR, Jan. 20-28, 2011, 3 pages.

Marpe D., et al., "Context-Based Adaptive Binary Arithmetic Coding in the H.264AVC Video Compression Standard", IEEE Transaction on Circuits and Systems for Video Technology, IEEE Service Center, Piscataway, NJ, US, vol. 13, No. 7, Jul. 1, 2003, pp. 620-636.

Nguyen T., et al., "Improved Context Modeling for Coding Quantized Transform Coefficients in Video Compression", Dec. 8, 2010, Picture Coding Symposium 2010; Aug. 12, 2010-Oct. 12, 2010; Nagoya, JP, XP030082008.

International Preliminary Report on Patentability of International Application No. PCT/US2016/015034, dated May 3, 2017, 19 pp.

Ono S., et al., "Ubiquitous Technology: High-Efficiency Coding of Moving Images—MEPG-4 and H.264--," 1st edition, Apr. 20, 2005, Ohmsha, Ltd., pp. 124, 125 and 134-136, ISBN: 4-274-20060-4.

Second Written Opinion for International Application No. PCT/US2016/015034, dated Feb. 8, 2017, 7 pp.

Response to Written Opinion dated Mar. 30, 2016 for International Application No. PCT/US2016/015034, filed Nov. 15, 2016, 5 pp.

Sekiguchi S., "Trend Report on Video Coding Standardization: HEVC: Next-generation International Standardization Project", Electronic Information and Communication Engineers Technical report, Japan, Institute of Electronics, Information and Communication Engineers, Feb. 28, 2011, vol. 110, No. 455, the first 13-18 pages, ISSN: 0913-5685.

Sekiguchi S-I., "Trend Report on Video Coding Standardization— HEVC: Next-Generation International Standardization Project-," IEICE Technical Report, vol. 110, No. 457, The Institute of Electronics, Information and Communication Engineers, Feb. 28, 2011, pp. 85-90, ISSN: 0913-5685.

Sjaberg R., et al., "Fine granularity slices", 3. JCT-VC Meeting; 94. MPEG Meeting; Oct. 7, 2010-Oct. 15, 2010; Guangzhou, CN (Joint Collaborative Team on Video Coding of ISO/IECJTC1/SC29/WG11 and ITU-T SG. 16); URL: http://wftp3.itu.int/av-arch/jctvc-site/, No. JCTVC-C154, Oct. 2, 2010 (Oct. 2, 2010), XP030007861, ISSN: 0000-0045.

Sullivan G.J., et al., "Overview of the High Efficiency Video Coding (HEVC) Standard", IEEE Transactions on Circuits and Systems for Video Technology, IEEE Service Center, Piscataway, NJ, US, vol. 22, No. 12, Dec. 1, 2012 (Dec. 1, 2012), pp. 1649-1668, XP011487803, ISSN: 1051-8215, DOI:10.1109/TCSVT.2012.2221191.

Sze (MIT) V.,"Massively Parallel CABAC", 38. VCEG Meeting, 89. MPEG Meeting, Jul. 1, 2009-Jul. 8, 2009, London,Geneva, (Video Coding Experts Group of ITU-T SG. 16), No. VCEG-AL21, Jul. 3, 2009 (Jul. 3, 2009), XP030003702.

Sze V., et al., "High Throughput CABAC Entropy Coding in HEVC", IEEE Transactions on Circuits and Systems for Video Technology, IEEE Service Center, Piscataway, NJ, US, vol. 22, No. 12, Dec. 1, 2012 (Dec. 1, 2012), pp. 1778-1791, XP011487151, ISSN: 1051-8215, DOI: 10.1109/TCSVT.2012.2221526.

Sze Vivienne et al.,"Joint Algorithm-Architecture Optimization of CABAC to Increase Speed and Reduce Area Cost", Acoustics, Speech and Signal Processing (ICASSP), 2011 IEEE International Conference on, IEEE, May 22, 2011 (May 22, 2011), pp. 1577-1580, XP032001128, DOI : 10.1109/ICASSP.2011.5946797, ISBN: 978-1-4577-0538-0, the whole document.

Tech G., et al., "3D-HEVC Draft Text 6," Joint Collaborative Team on 3D Video coding Extensions (JCT-3V) of ITU-T SG 16 WP 3 and ISO/IEC JTC 1/SC 29/WG 11 , JCT3V-J1001 , 10th Meeting: Strasbourg, FR, Oct. 18-24, 2014, 99 pp.

Wiegand T., et al., "Overview of the H.264/AVC Video Coding Standard," IEEE Transactions on Circuits and Systems for Video Technology, IEEE Service Center, Piscataway, NJ, US, vol. 13, No. 7, Jul. 1, 2003 (Jul. 1, 2003), pp. 560-576, XP011221093, ISSN: 1051-8215, DOI:10.1109/TCSVT.2003.815165.

Wiegand, T., et al., "WD2: Working Draft 2 of High-Efficiency Video Coding", Jan. 28, 2011, No. JCTVC-D503, Jan. 28, 2011 (Jan. 28, 2011), XP002679642, Retrieved from the Internet: URL: http://wftp3.itu.int/av-arch/jctvc-site/2011_01_D_Daegu/ [retrieved on Jul. 11, 2012], 153 pp.

Wiegand, T., et al., "WD3: Working Draft 3 of High-Efficiency Video Coding," Document JCTVC-E603, 5th Meeting: Geneva, CH, Mar. 16-23, 2011, 160 pages.

Wiegand T., et al.,"WD1: Working Draft 1 of High-Efficiency Video Coding", JCTVC-C403, Joint Collaborative Team on Video Coding (JCT-VC), of ITU-T SG16 WP3 and ISO/IEC JTC1/SC29/WG11, 3rd Meeting: Guangzhou, CN, Oct. 7-15, 2010, 137 pp.

Yamakage T., et al., "Video Coding Technologies for HD DVD-Video", Toshiba Review, vol. 60, No. 1, Toshiba Corporation, Jan. 1, 2005, pp. 17-20, ISSN:0372-0462.

Ye et al., "Improved H.264 Intra Coding Based on Bi-Directional Intra Prediction, Directional Transform, and Adaptive Coefficient Scanning", 15th IEEE international Conference, Oct. 12 through 15, 2008, DOI: 10.1109/ICIP.2008.4712205; published on IEEE Xplore on Dec. 12, 2008, 4 pp.

Zheng Y., et al., "CE11: Mode Dependent Coefficient Scanning", 4. JCT-VC Meeting; 95. MPEG Meeting; Jan. 20, 2011-Jan. 28, 2011; Daegu, KR (Joint Collaborative Team on Video Coding of ISO/IEC JTC1/SC29/WG11 AND ITU-T SG.16); No. JCTVC-D393, Jan. 16, 2011, pp. 1-5, XP030008432, ISSN: 0000-0013, URL: http://wftp3.itu.int/av-arch/jctvc-site.

Bross, et al., "High Efficiency Video Coding (HEVC) Text Specification Draft 6," JCTVC-H1003, Joint Collaborative Team on Video Coding (JCT-VC) of ITU-T SG16 WP3 and ISO/IEC JTC1/SC29/WG11, 8th Meeting: San Jose, CA, USA, Feb. 1-10, 2012, 259 pp.

Chen J., et al., "Simplified context model selection for block level syntax coding," 6th JCT-VC Meeting; Torino, IT (Joint Colloborative Team on Video Coding of ISO/IEC JTC1/SC29/WG11 and ITU-TSG.16), No. JCTVC-F497, Jul. 12, 2011 (Jul. 12, 2011), XP030049490.

Chuang T. D., et al., "CE1.A.3: Reducing line buffers for CABAC," 7th JCT-VC Meeting; 98. MPEG Meeting; Nov. 21, 2011-Nov. 30, 2011; Geneva, CH (Joint Collaborative Team on Video Coding of ISO/IEC JTC1/SC29/WG11 and ITU-T SG.16), 5 Pages, URL: http://wftp3.itu.int/av-arch/jctvc-site/, No. JCTVC-G200, Nov. 7, 2011 (Nov. 7, 2011), XP030110184.

High Efficiency Video Coding, Recommendation ITU-T H.265, ITUT, Apr. 2013, H.265, Apr. 2013 (Apr. 2013), pp. 45, 86-87, 181-184.

* cited by examiner

CONTEXTS FOR LARGE CODING TREE UNITS

This application is a continuation of U.S. application Ser. No. 15/007,060, filed 26 Jan. 2016, which claims the benefit of U.S. Provisional Patent Application No. 62/108,465 filed 27 Jan. 2015, the entire content of each of which is hereby incorporated by reference herein.

TECHNICAL FIELD

This disclosure relates to video coding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), ITU-T H.265, High Efficiency Video Coding (HEVC), and extensions of such standards. The video devices may transmit, receive, encode, decode, and/or store digital video information more efficiently by implementing such video compression techniques.

Video compression techniques include spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicates the difference between the coded block and the predictive block. An intra-coded block is encoded according to an intra-coding mode and the residual data. For further compression, the residual data may be transformed from the pixel domain to a transform domain, resulting in residual coefficients, which then may be quantized. The quantized coefficients, initially arranged in a two-dimensional array, may be scanned in order to produce a one-dimensional vector of coefficients, and entropy coding may be applied to achieve even more compression.

SUMMARY

Techniques of this disclosure relate to video coding. For example, the techniques described in this disclosure may include one or more techniques for encoding or decoding a block of video data by performing an entropy coding process. For example, one or more techniques described herein may include performing context-adaptive binary arithmetic coding (CABAC) context modeling of a syntax element associated with a coding unit (CU) based on at least one of information of a spatially-neighboring CU relative to the CU or a temporally-neighboring CU relative to the CU.

In one example, this disclosure describes a method of coding video data comprising selecting, as part of an entropy coding process, a context for a syntax element associated with a current coding unit (CU) based on information relating to CU depth of one or more neighboring CUs relative to the current CU, wherein the syntax element represents whether the current CU is split into sub-CUs; and entropy coding the syntax element based on the selected context.

In another example, this disclosure describes a device for coding video data comprising a memory configured to store the video data; and a video coder in communication with the memory, wherein the video coder is configured to: select, as part of an entropy coding process, a context for a syntax element associated with a current coding unit (CU) stored in the memory based on information relating to CU depth of one or more neighboring CUs relative to the current CU, wherein the syntax element represents whether the current CU is split into sub-CUs; and entropy code the syntax element based on the selected context.

In another example, this disclosure describes an apparatus for coding video data comprising means for selecting, as part of an entropy coding process, a context for a syntax element associated with a current coding unit (CU) based on information relating to CU depth of one or more neighboring CUs relative to the current CU, wherein the syntax element represents whether the current CU is split into sub-CUs; and means for entropy coding the syntax element based on the selected context.

In another example, this disclosure describes a non-transitory computer-readable storage medium having instructions stored thereon that, when executed, cause one or more processors to select, as part of an entropy coding process, a context for a syntax element associated with a current coding unit (CU) based on information relating to CU depth of one or more neighboring CUs relative to the current CU, wherein the syntax element represents whether the current CU is split into sub-CUs; and entropy code the syntax element based on the selected context.

The details of one or more examples of the disclosure are set forth in the accompanying drawings and the description below. Other features, objects, and advantages of the disclosure will be apparent from the description and drawings, and from the claims.

DETAILED DESCRIPTION

The techniques of this disclosure generally relate to video coding and compression. More particularly, this disclosure relates to the signaling of syntax elements in block based video coding when, for example, the coding of large coding tree units (CTUs) is supported. For example, this disclosure describes techniques for coding syntax elements related to CTUs. As another example, this disclosure describes techniques for entropy coding syntax elements. As another example, this disclosure describes techniques relating to binarization, context modeling, and arithmetic coding of syntax elements. As yet another example, this disclosure describes techniques relating to binarization, context modeling, and arithmetic coding of syntax elements using an entropy coding process, such as context-adaptive binary arithmetic coding (CABAC). The techniques of this disclosure may be applied to an existing video codec or video coding standard (e.g., ITU-T H.265, HEVC), or may be applied in a future video codec or video coding standard.

Context-adaptive binary arithmetic coding (CABAC) is a method of entropy coding first introduced in H.264/AVC and now used in the newest HEVC standard. CABAC generally involves three main functions: binarization, context modeling, and arithmetic coding. Binarization maps syntax elements to binary symbols (bins), which may be called bin strings. Context modeling estimates the probability of the bins. As part of the context modeling process, a video coder selects or a context model for each bin. The context model represents the probability. Different context models may be selected for different bins. Arithmetic coding compresses the bins to bits based on the estimated probability. Otherwise stated, arithmetic coding compresses the bins to bits based on the selected context model corresponding to each bin.

The techniques of this disclosure may improve the bitstream efficiency of coding syntax elements. For example, the techniques of this disclosure may improve the bitstream efficiency of coding syntax elements related to CTUs and coding units (CUs). As another example, the techniques of this disclosure may particularly improve CABAC coding efficiency. As another example, the techniques of this disclosure may particularly improve CABAC coding efficiency of syntax elements related to CTUs and CUs when, for example, large CTU sizes are enabled.

Figure 1:
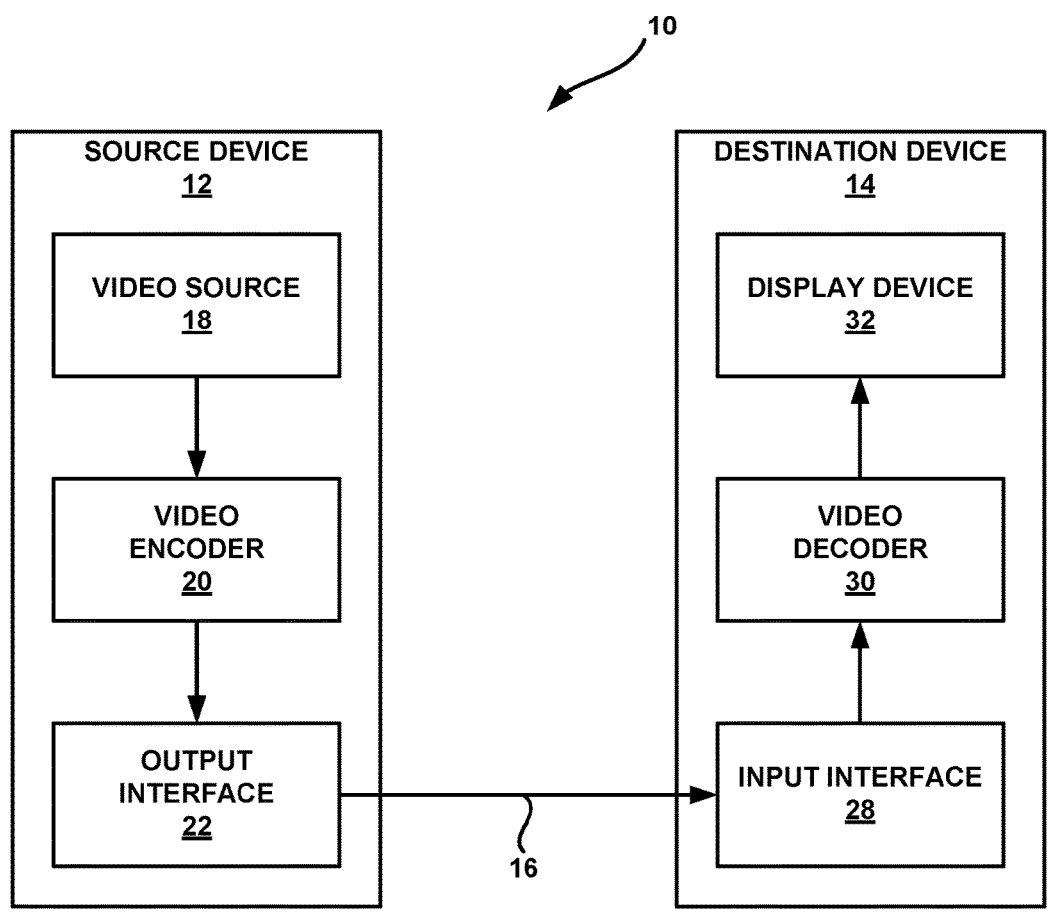
FIG. 1 is a block diagram illustrating an example video coding system that may utilize the techniques described in this disclosure.

FIG. 1 is a block diagram illustrating an example video coding system 10 that may utilize the techniques of this disclosure. As used herein, the term "video coder" refers generically to both video encoders and video decoders. In this disclosure, the term "video coding" may refer generically to video encoding or video decoding. Similarly, the term "coding" may refer generically to encoding or decoding. For example, reference to entropy coding may refer to entropy encoding or entropy decoding. Video encoder 20 and video decoder 30 of video coding system 10 represent examples of devices that may be configured to perform one or more techniques of this disclosure. For example, video encoder 20 and video decoder 30 may be configured to perform techniques for coding data related to CTUs and CUs in accordance with various examples described in this disclosure. As one example, video encoder 20 and video decoder 30 may be configured to limit CTU size and/or perform CABAC context modeling for syntax elements related to CTUs and/or CUs.

Video encoder 20 and/or video decoder 30 may be configured to operate according to the techniques described in this disclosure. Video decoder 30 may be configured to perform a process generally reciprocal to that of video encoder 20 described herein. Similarly, video encoder 20 may be configured to perform a process generally reciprocal to that of video decoder 30 described herein.

Figure 2:
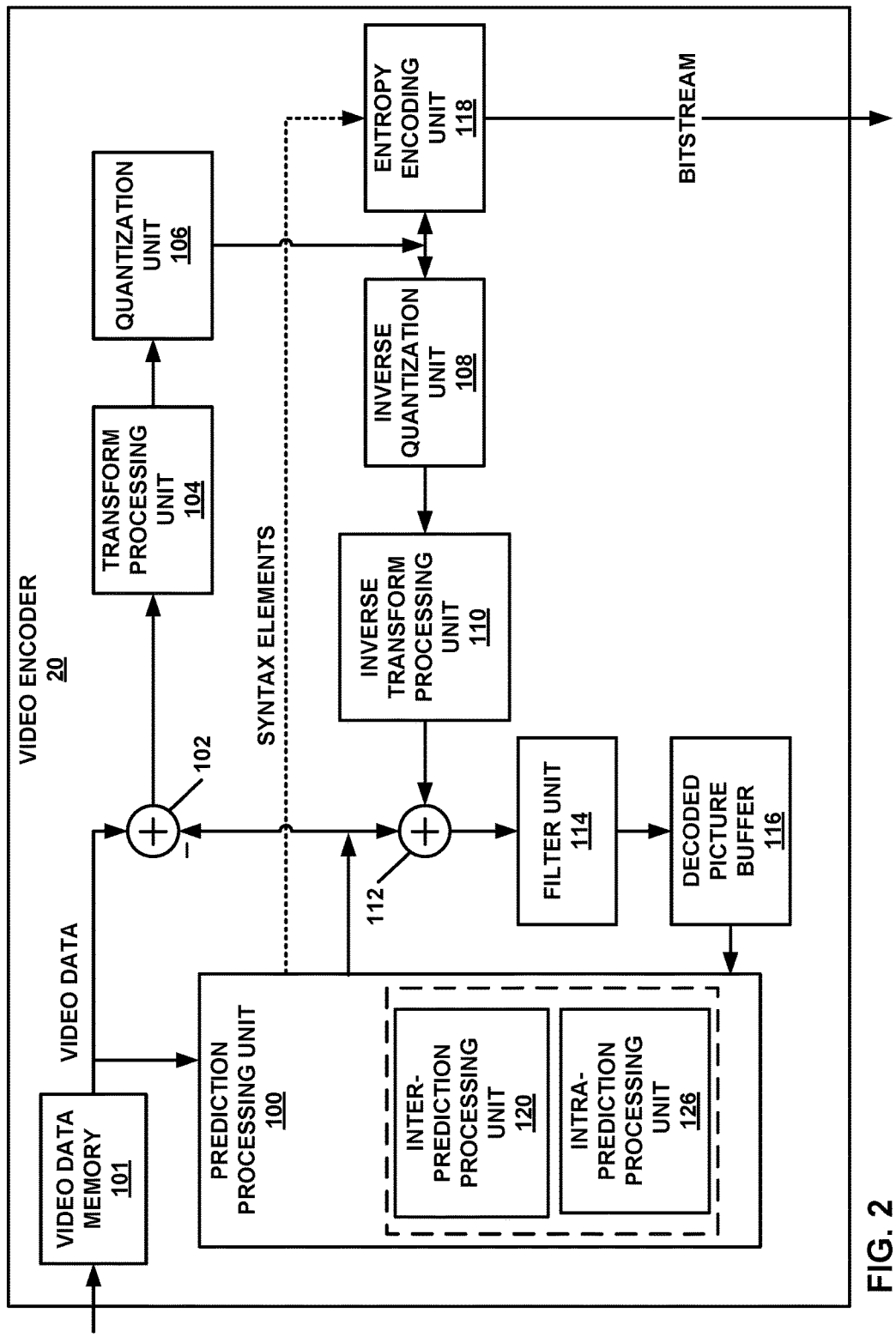
FIG. 2 is a block diagram illustrating an example video encoder that may implement the techniques described in this disclosure.
Figure 3:
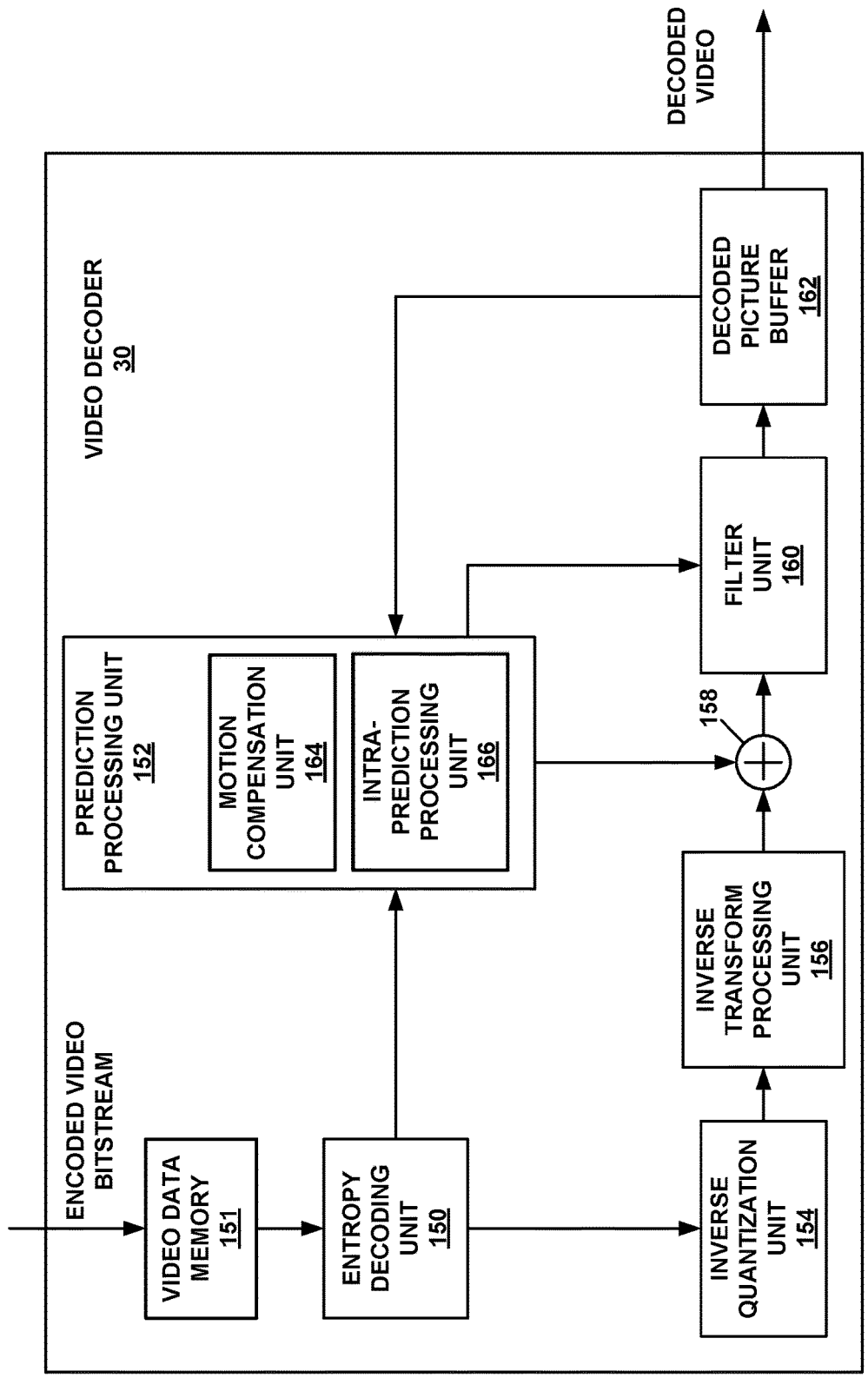
FIG. 3 is a block diagram illustrating an example video decoder that may implement the techniques described in this disclosure.

The techniques described herein may be performed by video encoder 20 and/or video decoder 30, which are respectively illustrated in FIGS. 1-3. It should be understood that all of the techniques described herein may be used individually or in any combination. For example, video encoder 20 and/or one or more components thereof and video decoder 30 and/or one or more components thereof may perform the techniques described in this disclosure in any combination. As another example, video encoder 20 and/or video decoder 30 may be configured to select, as part of an entropy coding process, a context for a syntax element associated with a current coding unit (CU) based on information relating to CU depth of one or more neighboring CUs relative to the current CU. The syntax element may represent whether the current CU is split into sub-CUs. In this example, video encoder 20 and/or video decoder 30 may be configured to entropy code the syntax element based on the selected context. As used herein, CU depth may refer to quad-tree depth of a CU. For example, the CU depth of a current CU may refer to the quad-tree depth of the current CU, and the CU depth of a neighboring block (e.g., neighboring CU) may refer to the quad-tree depth of the neighboring block. As another example, video encoder 20 and/or video decoder 30 respectively shown in FIGS. 1-3 may be configured to respectively perform one or more steps in any combination shown in FIGS. 4-6 and/or any step described with respect to FIGS. 4-6 that may not be depicted.

As shown in FIG. 1, video coding system 10 includes a source device 12 and a destination device 14. Source device 12 generates encoded video data. Accordingly, source device 12 may be referred to as a video encoding device or a video encoding apparatus. Destination device 14 may decode the encoded video data generated by source device 12. Accordingly, destination device 14 may be referred to as a video decoding device or a video decoding apparatus. Source device 12 and destination device 14 may be examples of video coding devices or video coding apparatuses.

Source device 12 and destination device 14 may comprise a wide range of devices, including desktop computers, mobile computing devices, notebook (e.g., laptop) computers, tablet computers, set-top boxes, telephone handsets such as so-called "smart" phones, televisions, cameras, display devices, digital media players, video gaming consoles, in-car computers, or the like.

Destination device 14 may receive encoded video data from source device 12 via a channel 16. Channel 16 may comprise any type of medium and/or one or more media or devices capable of moving the encoded video data from source device 12 to destination device 14. In one example, channel 16 may comprise one or more communication media that enable source device 12 to transmit encoded video data directly to destination device 14 in real-time. In this example, source device 12 may modulate the encoded video data according to a communication standard, such as a wireless communication protocol, and may transmit the modulated video data to destination device 14. The one or more communication media may include wireless and/or wired communication media, such as a radio frequency (RF) spectrum or one or more physical transmission lines. The one or more communication media may form part of a packet-based network, such as a local area network, a wide-area network, or a global network (e.g., the Internet). The one or more communication media may include routers, switches, base stations, or other equipment that facilitate communication from source device 12 to destination device 14.

In another example, channel 16 may include a storage medium that stores encoded video data generated by source device 12. In this example, destination device 14 may access the storage medium, e.g., via disk access or card access. The storage medium may include a variety of locally-accessed data storage media such as Blu-ray discs, DVDs, CD-ROMs, flash memory, or other suitable digital storage media for storing encoded video data.

In a further example, channel 16 may include a file server or another intermediate storage device that stores encoded video data generated by source device 12. In this example, destination device 14 may access encoded video data stored at the file server or other intermediate storage device via streaming or download. The file server may be a type of server capable of storing encoded video data and transmitting the encoded video data to destination device 14. Example file servers include web servers (e.g., for a website), file transfer protocol (FTP) servers, network attached storage (NAS) devices, and local disk drives.

Destination device 14 may access the encoded video data through a standard data connection, such as an Internet connection. Example types of data connections may include wireless channels (e.g., Wi-Fi connections), wired connections (e.g., DSL, cable modem, etc.), or combinations of both that are suitable for accessing encoded video data stored on a file server. The transmission of encoded video data from the file server may be a streaming transmission, a download transmission, or a combination of both.

The techniques of this disclosure are not limited to wireless applications or settings. The techniques of this disclosure may be applied to video coding in support of any of a variety of multimedia applications, such as over-the-air television broadcasts, cable television transmissions, satellite television transmissions, streaming video transmissions, e.g., via the Internet, encoding of video data for storage on a data storage medium, decoding of encoded video data stored on a data storage medium, or other applications. In some examples, video coding system 10 may be configured to support one-way or two-way video transmission to support applications such as video streaming, video playback, video broadcasting, and/or video telephony.

Video coding system 10 illustrated in FIG. 1 is merely an example and the techniques of this disclosure may apply to video coding settings (e.g., video encoding or video decoding) that do not necessarily include any data communication between the encoding and decoding devices. In other examples, data is retrieved from a local memory, streamed over a network, or the like. A video encoding device may encode and store data to memory, and/or a video decoding device may retrieve and decode data from memory. In many examples, the encoding and decoding is performed by devices that do not communicate with one another, but simply encode data to memory and/or retrieve and decode data from memory.

In the example of FIG. 1, source device 12 includes a video source 18, a video encoder 20, and an output interface 22. In some examples, output interface 22 may include a modulator/demodulator (modem) and/or a transmitter. Video source 18 may include a video capture device, e.g., a video camera, a video archive containing previously-captured video data, a video feed interface to receive video data from a video content provider, and/or a computer graphics system for generating video data, or a combination of such sources of video data.

Video encoder 20 may encode video data from video source 18. In some examples, source device 12 directly transmits the encoded video data to destination device 14 via output interface 22. In other examples, the encoded video data may also be stored onto a storage medium or a file server for later access by destination device 14 for decoding and/or playback.

In the example of FIG. 1, destination device 14 includes an input interface 28, a video decoder 30, and a display device 32. In some examples, input interface 28 includes a receiver and/or a modem. Input interface 28 may receive encoded video data over channel 16. The encoded video data communicated over channel 16, or provided by storage device 26, may include a variety of syntax elements generated by video encoder 20 for use by a video decoder, such as video decoder 30, in decoding the video data. Such syntax elements may be included with the encoded video data transmitted on a communication medium, stored on a storage medium, or stored a file server.

Display device 32 may be integrated with or may be external to destination device 14. In general, display device 32 displays decoded video data. Display device 32 may comprise a variety of display devices, such as a liquid crystal display (LCD), a plasma display, an organic light emitting diode (OLED) display, or another type of display device.

Video encoder 20 and video decoder 30 each may be implemented as any of a variety of suitable circuitry, such as one or more microprocessors, digital signal processors (DSPs), application-specific integrated circuits (ASICs), field-programmable gate arrays (FPGAs), discrete logic, hardware, or any combinations thereof. If the techniques are implemented partially in software, a device may store instructions for the software in a suitable, non-transitory computer-readable storage medium and may execute the instructions in hardware using one or more processors to perform the techniques of this disclosure. Any of the foregoing (including hardware, software, a combination of hardware and software, etc.) may be considered to be one or more processors. Each of video encoder 20 and video decoder 30 may be included in one or more encoders or decoders, either of which may be integrated as part of a combined encoder/decoder (CODEC) in a respective device.

This disclosure may generally refer to video encoder 20 "signaling" or "transmitting" certain information to another device, such as video decoder 30. The term "signaling" or "transmitting" may generally refer to the communication of syntax elements and/or other data used to decode the compressed video data. Such communication may occur in real- or near-real-time. Alternately, such communication may occur over a span of time, such as might occur when storing syntax elements to a computer-readable storage medium in an encoded bitstream at the time of encoding, which then may be retrieved by a decoding device at any time after being stored to this medium. Thus, while video decoder 30 may be referred to as "receiving" certain information, the receiving of information does not necessarily occur in real- or near-real-time and may be retrieved from a medium at some time after storage.

In some examples, video encoder 20 and video decoder 30 operate according to a video compression standard, such as HEVC standard mentioned above, and described in HEVC Draft 10. In addition to the base HEVC standard, there are ongoing efforts to produce scalable video coding, multiview video coding, and 3D coding extensions for HEVC.

In HEVC and other video coding standards, a video sequence typically includes a series of pictures. Pictures may also be referred to as "frames." A picture may include three sample arrays, denoted $S_L$, $S_{Cb}$ and $S_{Cr}$. $S_L$ is a two-dimensional array (i.e., a block) of luma samples. $S_{Cb}$ is a two-dimensional array of Cb chrominance samples. $S_{Cr}$ is a two-dimensional array of Cr chrominance samples. Chrominance samples may also be referred to herein as "chroma" samples. In other instances, a picture may be monochrome and may only include an array of luma samples.

To generate an encoded representation of a picture, video encoder 20 may generate a set of CTUs. Each of the CTUs may be a coding tree block of luma samples, two corresponding coding tree blocks of chroma samples, and syntax structures used to code the samples of the coding tree blocks. A coding tree block may be an N×N block of samples. A CTU may also be referred to as a "tree block" or a "largest coding unit" (LCU). The CTUs of HEVC may be broadly analogous to the macroblocks of other standards, such as H.264/AVC. However, a CTU is not necessarily limited to a particular size and may include one or more CUs. In monochrome pictures or pictures having three separate color planes, a CU may comprise a single coding block and syntax structures used to code the samples of the coding block. A slice may include an integer number of CTUs ordered consecutively in the raster scan.

In some examples, a CU may include a coding node and one or more prediction units (PUs) and/or transform units (TUs) associated with the coding node. The size of the CU may correspond to a size of the coding node and may be square in shape. The size of the CU may range from, for example, 8×8 pixels up to the size of the tree block with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be square or non-square in shape. Syntax data associated with a CU may also describe, for example, partitioning of the CU into one or more TUs according to a quadtree. A TU can be square or non-square in shape.

In general, a PU may include data related to the prediction process. For example, when a PU is intra-mode encoded, the PU may include data describing an intra-prediction mode for the PU. As another example, when a PU is inter-mode encoded, the PU may include data defining a motion vector for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector.

In general, a TU may be used for a transform and quantization processes. A given CU having one or more PUs may also include one or more transform units (TUs). Following prediction, video encoder 20 may calculate residual values corresponding to the PU. The residual values may comprise pixel difference values that may be transformed into transform coefficients, quantized, and scanned using the TUs to produce serialized transform coefficients for entropy coding.

This disclosure may use the term "video unit," "video block," "coding block," or "block" to refer to one or more sample blocks and syntax structures used to code samples of the one or more blocks of samples. Example types of video units or blocks may include coding tree units (CTUs), coding units (CUs), prediction units (PUs), transform units (TUs), macroblocks (MBs), macroblock partitions, and so on. In some contexts, discussion of PUs may be interchanged with discussion of macroblocks or macroblock partitions.

In some examples, a set of motion information may be available for each block of video data. The set of motion information may include motion information for forward and backward prediction directions. Forward and backward prediction directions may be two prediction directions of a bi-directional prediction mode. Forward and backward prediction directions may be one of two prediction directions of a uni-directional prediction mode. The terms "forward" and "backward" do not necessarily have a geometry meaning, instead they correspond to, for example, reference picture list 0 (RefPicList0) and reference picture list 1 (RefPicList1) of a current picture. When only one reference picture list is available for a picture or slice, only RefPicList0 may be available and the motion information of each block of the picture or slice may be forward.

For each prediction direction (e.g., forward or backward), the motion information may contain a prediction direction, a reference index, and a motion vector. In some examples, for simplicity, a motion vector itself may be referred to in a way that it is assumed that it has an associated reference index. A reference index is used to identify a reference picture in the current reference picture list (e.g., RefPicList0 or RefPicList1). A motion vector may have a horizontal and a vertical component.

Video blocks described herein may have fixed or varying sizes, and may differ in size according to a specified coding standard. As an example, the size of a particular CU may be 2N×2N. In such an example, video encoder 20 may be configured to perform intra-prediction for PUs having sizes of 2N×2N or N×N, and may be configured to perform inter-prediction for PUs having sizes of 2N×2N, 2N×N, N×2N, or N×N. In other examples, the available sizes of a PU may be the same or different.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a positive integer value. The pixels in a block may be arranged in rows and columns. Moreover, blocks need not necessarily have the same number of pixels in the horizontal direction as in the vertical direction. For example, blocks may comprise N×M pixels, where M is or is not equal to N and where M is a positive integer value.

Referring to FIG. 1, to generate a coded CTU, video encoder 20 may recursively perform quad-tree partitioning on the coding tree blocks of a CTU to divide the coding tree blocks into coding blocks, hence the name "coding tree units." A coding block may be an N×N (or N×M) block of samples. A CU may be a coding block of luma samples and two corresponding coding blocks of chroma samples of a picture that has a luma sample array, a Cb sample array and a Cr sample array, and syntax structures used to code the samples of the coding blocks. Video encoder 20 may partition a coding block of a CU into one or more PUs. A PU may be a square or non-square block of samples on which the same prediction technique is applied. A PU of a CU may be a prediction block of luma samples, two corresponding prediction blocks of chroma samples of a picture, and syntax structures used to predict the prediction block samples. Video encoder 20 may generate predictive luma, Cb, and Cr blocks for luma, Cb, and Cr prediction blocks of each PU of the CU.

Video encoder 20 may use intra prediction or inter prediction to generate the predictive blocks for a PU. If video encoder 20 uses intra prediction to generate the predictive blocks of a PU, video encoder 20 may generate the predictive blocks of the PU based on decoded samples of the picture associated with the PU.

If video encoder 20 uses inter prediction to generate the predictive blocks of a PU, video encoder 20 may generate the predictive blocks of the PU based on decoded samples of one or more pictures other than the picture associated with the PU. Video encoder 20 may use uni-prediction or bi-prediction to generate the predictive blocks of a PU. When video encoder 20 uses uni-prediction to generate the predictive blocks for a PU, the PU may have a single motion vector (MV). When video encoder 20 uses bi-prediction to generate the predictive blocks for a PU, the PU may have two MVs.

After video encoder 20 generates predictive blocks (e.g., predictive luma, Cb and Cr blocks) for one or more PUs of a CU, video encoder 20 may generate residual blocks for the CU. Each sample in a residual block of the CU may indicate a difference between a sample in a predictive block of a PU of the CU and a corresponding sample in a coding block of the CU. For example, video encoder 20 may generate a luma residual block for the CU. Each sample in the CU's luma residual block indicates a difference between a luma sample in one of the CU's predictive luma blocks and a corresponding sample in the CU's original luma coding block. In addition, video encoder 20 may generate a Cb residual block for the CU. Each sample in the CU's Cb residual block may indicate a difference between a Cb sample in one of the CU's predictive Cb blocks and a corresponding sample in the CU's original Cb coding block. Video encoder 20 may also generate a Cr residual block for the CU. Each sample in the CU's Cr residual block may indicate a difference between a Cr sample in one of the CU's predictive Cr blocks and a corresponding sample in the CU's original Cr coding block.

Video encoder 20 may use quad-tree partitioning to decompose the residual blocks (e.g., luma, Cb and Cr residual blocks) of a CU into one or more transform blocks (e.g., luma, Cb and Cr transform blocks). As used herein, CU depth may refer to quad-tree depth of a CU. For example, the CU depth of a current CU may refer to the quad-tree depth of the current CU, and the CU depth of a neighboring block (e.g., neighboring CU) may refer to the quad-tree depth of the neighboring block. A transform block may be a block of samples on which the same transform is applied. A transform unit (TU) of a CU may be a transform block of luma samples, two corresponding transform blocks of chroma samples, and syntax structures used to transform the transform block samples. Thus, each TU of a CU may be associated with a luma transform block, a Cb transform block, and a Cr transform block. The luma transform block associated with the TU may be a sub-block of the CU's luma residual block. The Cb transform block may be a sub-block of the CU's Cb residual block. The Cr transform block may be a sub-block of the CU's Cr residual block.

Video encoder 20 may apply one or more transforms to a transform block to generate a coefficient block for a TU. A coefficient block may be a two-dimensional array of transform coefficients. A transform coefficient may be a scalar quantity. For example, video encoder 20 may apply one or more transforms to a luma transform block of a TU to generate a luma coefficient block for the TU. Video encoder 20 may apply one or more transforms to a Cb transform block of a TU to generate a Cb coefficient block for the TU. Video encoder 20 may apply one or more transforms to a Cr transform block of a TU to generate a Cr coefficient block for the TU.

In some examples, following intra-predictive or inter-predictive coding using PUs of a CU, video encoder 20 may calculate residual data for the TUs of the CU. The PUs may comprise pixel data in the spatial domain (also referred to as the pixel domain) and the TUs may comprise coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs including the residual data for the CU, and then transform the TUs to produce transform coefficients for the CU.

After generating a coefficient block (e.g., a luma coefficient block, a Cb coefficient block or a Cr coefficient block), video encoder 20 may quantize the coefficients in the block. Quantization generally refers to a process in which transform coefficients are quantized to possibly reduce the amount of data used to represent the transform coefficients, providing further compression. After video encoder 20 quantizes a coefficient block, video encoder 20 may be configured to entropy encode syntax elements indicating the quantized transform coefficients. For example, video encoder 20 may perform Context-Adaptive Binary Arithmetic Coding (CABAC) on the syntax elements indicating the quantized transform coefficients. Video encoder 20 may output the entropy-encoded syntax elements in a bitstream.

Video encoder 20 may output a bitstream that includes the entropy-encoded syntax elements. The bitstream may include a sequence of bits that forms a representation of coded pictures and associated data. The bitstream may comprise a sequence of network abstraction layer (NAL) units. Each of the NAL units includes a NAL unit header and encapsulates a raw byte sequence payload (RBSP). The NAL unit header may include a syntax element that indicates a NAL unit type code. The NAL unit type code specified by the NAL unit header of a NAL unit indicates the type of the NAL unit. A RBSP may be a syntax structure containing an integer number of bytes that is encapsulated within a NAL unit. In some instances, an RBSP includes zero bits.

Different types of NAL units may encapsulate different types of RBSPs. For example, a first type of NAL unit may encapsulate an RBSP for a picture parameter set (PPS), a second type of NAL unit may encapsulate an RBSP for a coded slice, a third type of NAL unit may encapsulate an RB SP for SEI, and so on. NAL units that encapsulate RBSPs for video coding data (as opposed to RBSPs for parameter sets and SEI messages) may be referred to as video coding layer (VCL) NAL units.

Video decoder 30 may receive a bitstream generated by video encoder 20. In addition, video decoder 30 may parse the bitstream to decode syntax elements from the bitstream.

Video decoder 30 may reconstruct the pictures of the video data based at least in part on the syntax elements decoded from the bitstream. The process to reconstruct the video data may be generally reciprocal to the process performed by video encoder 20. For instance, video decoder 30 may use MVs of PUs to determine predictive blocks for the inter-predicted PUs of a current CU. Likewise, video decoder 30 may generate intra-predicted blocks for PU's of a current CU. In addition, video decoder 30 may inverse quantize transform coefficient blocks associated with TUs of the current CU. Video decoder 30 may perform inverse transforms on the transform coefficient blocks to reconstruct transform blocks associated with the TUs of the current CU. Video decoder 30 may reconstruct the coding blocks of the current CU by adding the samples of the predictive blocks for PUs of the current CU to corresponding residual values obtained from inverse quantization and inverse transformation of the transform blocks of the TUs of the current CU. By reconstructing the coding blocks for each CU of a picture, video decoder 30 may reconstruct the picture.

In some examples, video encoder 20 may utilize a predefined scan order (e.g., horizontal, vertical, or any other scan order) to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to context adaptive variable length coding (CAVLC), context adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

To perform CABAC, video encoder 20 may assign a context within a context model to a symbol to be transmitted. The context may relate to, for example, whether neighboring values of the symbol are non-zero or not. To perform CAVLC, video encoder 20 may select a variable length code for a symbol to be transmitted. Codewords in VLC may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

Video encoder 20 and/or video decoder 30 may be configured to operate according to the techniques described in this disclosure. In general, video encoder 20 and/or video decoder 30 may be configured to perform one or more techniques described herein in any combination. In some examples, video encoder 20 and video decoder 30 may be configured to perform the techniques of this disclosure related to coding information associated with CTUs and CUs. For example, video encoder 20 and video decoder 30 may be configured to perform context-adaptive binary arithmetic coding (CABAC) context modeling of a syntax element associated with a coding unit (CU) based on at least one of information of a spatially-neighboring CU relative to the CU or a temporally-neighboring CU relative to the CU, and CABAC code the syntax element based on the modeled context. In another example, video encoder 20 and video decoder 30 may be configured to: in response to determining that a CTU size is greater than 64×64, determine a group of constraints comprising: a maximum CU depth and a minimum CU depth of the CTU, and code the CTU based on at least some of the group of constraints.

It is understood that techniques of this disclosure may utilize HEVC terminology or other video standard terminology for ease of explanation. However, it is understood that the techniques of this disclosure are not limited to HEVC or other video standards. The techniques of this disclosure may be implemented in successor standards to HEVC and its extensions as well as other video standards, whether past, present, or future.

FIG. 2 is a block diagram illustrating an example video encoder 20 that may implement the techniques of this disclosure. FIG. 2 is provided for purposes of explanation and should not be considered limiting of the techniques as broadly exemplified and described in this disclosure. For purposes of explanation, this disclosure describes video encoder 20 in the context of HEVC coding. However, the techniques of this disclosure may be applicable to other coding standards or methods.

Video encoder 20 represents an example of a device that may be configured to perform techniques related to coding CTUs and CUs, including CABAC coding of CTUs and CUs in accordance with various examples described in this disclosure.

For example, video encoder 20 may be configured to perform context-adaptive binary arithmetic coding (CABAC) context modeling of a syntax element associated with a coding unit (CU) based on at least one of information of a spatially-neighboring CU relative to the CU or a temporally-neighboring CU relative to the CU, and CABAC encode the syntax element based on the modeled context.

In another example, video encoder 20 may be configured to: in response to determining that a CTU size is greater than 64×64, determine a group of constraints comprising: a maximum CU depth and a minimum CU depth of the CTU, and encode the CTU based on at least some of the group of constraints.

In the example of FIG. 2, video encoder 20 includes a prediction processing unit 100, video data memory 101, a residual generation unit 102, a transform processing unit 104, a quantization unit 106, an inverse quantization unit 108, an inverse transform processing unit 110, a reconstruction unit 112, a filter unit 114, a decoded picture buffer 116, and an entropy encoding unit 118. Prediction processing unit 100 includes an inter-prediction processing unit 120 and an intra-prediction processing unit 126. Inter-prediction processing unit 120 includes a motion estimation unit and a motion compensation unit (not shown). In other examples, video encoder 20 may include more, fewer, or different functional components.

Video data memory 101 may store video data to be encoded by the components of video encoder 20. The video data stored in video data memory 101 may be obtained, for example, from video source 18. Decoded picture buffer 116 may be a reference picture memory that stores reference video data for use in encoding video data by video encoder 20, e.g., in intra- or inter-coding modes. Video data memory 101 and decoded picture buffer 116 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 101 and decoded picture buffer 116 may be provided by the same memory device or separate memory devices. In various examples, video data memory 101 may be on-chip with other components of video encoder 20, or off-chip relative to those components.

Video encoder 20 may receive video data. Video encoder 20 may encode each CTU in a slice of a picture of the video data. Each of the CTUs may be associated with equally-sized luma coding tree blocks (CTBs) and corresponding CTBs of the picture. As part of encoding a CTU, prediction processing unit 100 may perform quad-tree partitioning to divide the CTBs of the CTU into progressively-smaller blocks. The smaller block may be coding blocks of CUs. For example, prediction processing unit 100 may partition a CTB associated with a CTU into four equally-sized sub-blocks, partition one or more of the sub-blocks into four equally-sized sub-sub-blocks, and so on.

Video encoder 20 may encode CUs of a CTU to generate encoded representations of the CUs (i.e., coded CUs). As part of encoding a CU, prediction processing unit 100 may partition the coding blocks associated with the CU among one or more PUs of the CU. Thus, each PU may be associated with a luma prediction block and corresponding chroma prediction blocks. Video encoder 20 and video decoder 30 may support PUs having various sizes. As indicated above, the size of a CU may refer to the size of the luma coding block of the CU and the size of a PU may refer to the size of a luma prediction block of the PU. Assuming that the size of a particular CU is 2N×2N, video encoder 20 and video decoder 30 may support PU sizes of 2N×2N or N×N for intra prediction, and symmetric PU sizes of 2N×2N, 2N×N, N×2N, N×N, or similar for inter prediction. Video encoder 20 and video decoder 30 may also support asymmetric partitioning for PU sizes of 2N×nU, 2N×nD, nL×2N, and nR×2N for inter prediction.

Inter-prediction processing unit 120 may generate predictive data for a PU by performing inter prediction on each PU of a CU. The predictive data for the PU may include predictive blocks of the PU and motion information for the PU. Inter-prediction unit 121 may perform different operations for a PU of a CU depending on whether the PU is in an I slice, a P slice, or a B slice. In an I slice, all PUs are intra predicted. Hence, if the PU is in an I slice, inter-prediction unit 121 does not perform inter prediction on the PU. Thus, for blocks encoded in I-mode, the predicted block is formed using spatial prediction from previously-encoded neighboring blocks within the same frame.

If a PU is in a P slice, the motion estimation unit of inter-prediction processing unit 120 may search the reference pictures in a list of reference pictures (e.g., "RefPicList0") for a reference region for the PU. The reference region for the PU may be a region, within a reference picture, that contains sample blocks that most closely corresponds to the sample blocks of the PU. The motion estimation unit of inter-prediction processing unit 120 may generate a reference index that indicates a position in RefPicList0 of the reference picture containing the reference region for the PU. In addition, the motion estimation unit may generate an MV that indicates a spatial displacement between a coding block of the PU and a reference location associated with the reference region. For instance, the MV may be a two-dimensional vector that provides an offset from the coordinates in the current decoded picture to coordinates in a reference picture. The motion estimation unit may output the reference index and the MV as the motion information of the PU. The motion compensation unit of inter-prediction processing unit 120 may generate the predictive blocks of the PU based on actual or interpolated samples at the reference location indicated by the motion vector of the PU.

If a PU is in a B slice, the motion estimation unit may perform uni-prediction or bi-prediction for the PU. To perform uni-prediction for the PU, the motion estimation unit may search the reference pictures of RefPicList0 or a second reference picture list ("RefPicList1") for a reference region for the PU. The motion estimation unit may output, as the motion information of the PU, a reference index that indicates a position in RefPicList0 or RefPicList1 of the reference picture that contains the reference region, an MV that indicates a spatial displacement between a prediction block of the PU and a reference location associated with the reference region, and one or more prediction direction indicators that indicate whether the reference picture is in RefPicList0 or RefPicList1. The motion compensation unit of inter-prediction processing unit 120 may generate the predictive blocks of the PU based at least in part on actual or interpolated samples at the reference region indicated by the motion vector of the PU.

To perform bi-directional inter prediction for a PU, the motion estimation unit may search the reference pictures in RefPicList0 for a reference region for the PU and may also search the reference pictures in RefPicList1 for another reference region for the PU. The motion estimation unit may generate reference picture indexes that indicate positions in RefPicList0 and RefPicList1 of the reference pictures that contain the reference regions. In addition, the motion estimation unit may generate MVs that indicate spatial displacements between the reference location associated with the reference regions and a sample block of the PU. The motion information of the PU may include the reference indexes and the MVs of the PU. The motion compensation unit may generate the predictive blocks of the PU based at least in part on actual or interpolated samples at the reference regions indicated by the motion vectors of the PU.

Intra-prediction processing unit 126 may generate predictive data for a PU by performing intra prediction on the PU. The predictive data for the PU may include predictive blocks for the PU and various syntax elements. Intra-prediction processing unit 126 may perform intra prediction on PUs in I slices, P slices, and B slices.

To perform intra prediction on a PU, intra-prediction processing unit 126 may use multiple intra prediction modes to generate multiple sets of predictive data for the PU. Intra-prediction processing unit 126 may use samples from sample blocks of neighboring PUs to generate a predictive block for a PU. The neighboring PUs may be above, above and to the right, above and to the left, or to the left of the PU, assuming a left-to-right, top-to-bottom encoding order for PUs, CUs, and CTUs. Intra-prediction processing unit 126 may use various numbers of intra prediction modes, e.g., 33 directional intra prediction modes. In some examples, the number of intra prediction modes may depend on the size of the region associated with the PU.

Prediction processing unit 100 may select the predictive data for PUs of a CU from among the predictive data generated by inter-prediction processing unit 120 for the PUs or the predictive data generated by intra-prediction processing unit 126 for the PUs. In some examples, prediction processing unit 100 selects the predictive data for the PUs of the CU based on rate/distortion metrics of the sets of predictive data. The predictive blocks of the selected predictive data may be referred to herein as the selected predictive blocks.

Residual generation unit 102 may generate, based on the luma, Cb and Cr coding block of a CU and the selected predictive luma, Cb and Cr blocks of the PUs of the CU, a luma, Cb and Cr residual blocks of the CU. For instance, residual generation unit 102 may generate the residual blocks of the CU such that each sample in the residual blocks has a value equal to a difference between a sample in a coding block of the CU and a corresponding sample in a corresponding selected predictive block of a PU of the CU.

Transform processing unit 104 may perform quad-tree partitioning to partition the residual blocks associated with a CU into transform blocks associated with TUs of the CU. Thus, in some examples, a TU may be associated with a luma transform block and two chroma transform blocks. The sizes and positions of the luma and chroma transform blocks of TUs of a CU may or may not be based on the sizes and positions of prediction blocks of the PUs of the CU. A quad-tree structure known as a "residual quad-tree" (RQT) may include nodes associated with each of the regions. The TUs of a CU may correspond to leaf nodes of the RQT.

Transform processing unit 104 may generate transform coefficient blocks for each TU of a CU by applying one or more transforms to the transform blocks of the TU. Transform processing unit 104 may apply various transforms to a transform block associated with a TU. For example, transform processing unit 104 may apply a discrete cosine transform (DCT), a directional transform, or a conceptually similar transform to a transform block. In some examples, transform processing unit 104 does not apply transforms to a transform block. In such examples, the transform block may be treated as a transform coefficient block.

Quantization unit 106 may quantize the transform coefficients in a coefficient block. The quantization process may reduce the bit depth associated with some or all of the transform coefficients. For example, an n-bit transform coefficient may be rounded down to an m-bit transform coefficient during quantization, where n is greater than m. Quantization unit 106 may quantize a coefficient block associated with a TU of a CU based on a quantization parameter (QP) value associated with the CU. Video encoder 20 may adjust the degree of quantization applied to the coefficient blocks associated with a CU by adjusting the QP value associated with the CU. Quantization may introduce loss of information, thus quantized transform coefficients may have lower precision than the original ones.

Inverse quantization unit 108 and inverse transform processing unit 110 may apply inverse quantization and inverse transforms to a coefficient block, respectively, to reconstruct a residual block from the coefficient block. Reconstruction unit 112 may add the reconstructed residual block to corresponding samples from one or more predictive blocks generated by prediction processing unit 100 to produce a reconstructed transform block associated with a TU. By reconstructing transform blocks for each TU of a CU in this way, video encoder 20 may reconstruct the coding blocks of the CU.

Filter unit 114 may perform one or more deblocking operations to reduce blocking artifacts in the coding blocks associated with a CU. Decoded picture buffer 116 may store the reconstructed coding blocks after filter unit 114 performs the one or more deblocking operations on the reconstructed coding blocks. Inter-prediction processing unit 120 may use a reference picture that contains the reconstructed coding blocks to perform inter prediction on PUs of other pictures. In addition, intra-prediction processing unit 126 may use reconstructed coding blocks in decoded picture buffer 116 to perform intra prediction on other PUs in the same picture as the CU.

Entropy encoding unit 118 may receive data from other functional components of video encoder 20. For example, entropy encoding unit 118 may receive coefficient blocks from quantization unit 106 and may receive syntax elements from prediction processing unit 100. Such syntax elements may include syntax elements related to the size and partitioning of CTUs and CUs. Entropy encoding unit 118 may perform one or more entropy encoding operations on the data to generate entropy-encoded data. For example, entropy encoding unit 118 may perform a context-adaptive coding operation, such as a CABAC operation, context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. Video encoder 20 may output a bitstream that includes entropy-encoded data generated by entropy encoding unit 118. For instance, the bitstream may include data that represents a RQT for a CU.

Some techniques of this disclosure are related to CABAC coding of information related to, for example, CTUs and CUs. CABAC coding, which entropy encoding unit 118 performs, generally involves three main functions: binarization, context modeling, and arithmetic coding. Binarization maps syntax elements to binary symbols (bins), which may be called bin strings. Context modeling estimates the probability of the bins. As part of the context modeling process, a video coder selects or a context model for each bin. The context model represents the probability. Different context models may be selected for different bins. Arithmetic coding compresses the bins to bits based on the estimated probability. Otherwise stated, arithmetic coding compresses the bins to bits based on the selected context model corresponding to each bin.

In some examples, binarization may refer to a variety of binarization processes, such as unary, truncated unary, kth-order exponential-Golomb (EGk), and fixed length binarizations. During context modeling, entropy encoding unit 118 derives a probability estimation (e.g., a context model) for each bin in a process referred to as context modeling. Context modeling process may be highly adaptive.

Entropy encoding unit 118 may use different context models for different bins. Entropy encoding unit 118 may update the probability of the context models based on the values of previously coded bins. Bins with similar distributions often share the same context model. Entropy encoding unit 118 may select the context model for each bin based on the type of syntax element, bin position in syntax element (binIdx), luma/chroma, neighboring information, and other syntax elements.

During entropy coding, an entropy encoder or entropy decoder (e.g., entropy encoding unit 118 and entropy decoding unit 150) may place bits of a symbol to be encoded or decode into one or more bins. In some examples, the bins indicate whether a value of a symbol is equal to zero. The entropy encoder or entropy decoder may use the values of the bins to adjust the entropy coding process. In other examples, an entropy encoder or entropy decoder may also use bins to indicate whether a value is greater than a specific value, e.g., greater than zero, greater than one, etc.

Entropy encoding unit 118 may be configured to perform a process referred to as a "context switch." For example, entropy encoding unit 118 may be configured to perform a context-switch after encoding each bin. In some examples, entropy encoding unit 118 stores probability models (e.g., context models) as 7-bit entries (6 bits for the probability state and 1 bit for the most probable symbol (MPS)) in context memory. In such examples, entropy encoding unit 118 addresses the probability models (e.g., context models) using the context index computed by context selection logic.

Before encoding video data (e.g., a slice of video data), entropy encoding unit 118 initializes the probability models (e.g., context models) based on some pre-defined values. For example, given an input quantization parameter denoted as "qp," and a pre-defined value denoted as "initVal," entropy encoding unit 118 may derive the 7-bit entry of the probability model (denoted by the values "state" and "MPS") as follows:

qp=Clip3(0, 51, qp);
slope=(initVal>>4)*5−45;
offset=((initVal & 15)<<3)−16;
initState=min(max(1, (((slope*qp)>>4)+offset)), 126);
MPS=(initState>=64);
state=((mpState? (initState−64): (63−initState))<<1)+mpState;

Entropy encoding unit 118 may be configured to perform arithmetic coding based on, for example, a recursive interval division process. As part of the arithmetic coding process, entropy encoding unit 118 may be configured to divide a range into two subintervals based on the probability of the bin. In some examples, the range may initially range from 0 to 1. Entropy encoding unit 118 may be configured to select one of the two subintervals based on an offset that is converted to a binary fraction. The offset is derived from the encoded bin, and the selected subinterval is indicated by the value of the bin.

Entropy encoding unit 118 may be configured to update the range after every bin, such that the updated range equals the selected subinterval. Entropy encoding unit 118 may be configured to repeat the interval division process. The range and offset have limited bit precision, so entropy encoding unit 118 may be configured to perform renormalization whenever the range falls below a certain value to prevent underflow.

Entropy encoding unit 118 may perform renormalization after each bin is encoded. Similarly, entropy decoding unit 150 may perform renormalization after each bin is encoded. Entropy encoding unit 118 may perform arithmetic coding using an estimated probability (context-coded), or assuming equal probability of 0.5 (bypass coded). For bypass coded bins, entropy encoding unit 118 may perform the division of the range into subintervals by using an arithmetic shift, whereas a lookup table may be used for the context-coded bins.

During motion compensation and motion estimation, prediction processing unit 100 determines whether a CU should be divided into sub-blocks (e.g., prediction units (PUs) or smaller). For example, prediction processing unit 100 may perform a variety of encoding passes during which coding tree units (CTUs) are split in different ways, and then rate-distortion characteristics of each pass may be compared to other passes to determine which partitioning scheme for a CTU results in the best rate-distortion metrics. The value of the split_cu_flag syntax element (a flag) indicates whether a CU is split into coding units with half horizontal and vertical sizes relative to a parent CU. For each slice type (e.g., I, P, and B slices), entropy encoding unit 118 may be configured to code the split_cu_flag syntax element using CABAC with three contexts based on the information of spatially neighboring slices.

As defined in the HEVC specification, entropy encoding unit 118 may be configured to derive the context index offset (e.g., ctxInc) based on the availability of the block to the left and the block above the current block (e.g., availableL which specifies the availability of the block located directly to the left of the current block, or availableA which specifies the availability of the block located directly above the current block), and split information (i.e., CtDepth[xNbL/A][yNbL/A]>cqtDepth) of left/above-neighboring blocks. Table 9-38, copied from the HEVC standard, describes the derivation of the ctxInc syntax element as follows.

TABLE 9-38

Specification of ctxInc using left and above syntax elements

| Syntax element | condL | condA | ctxInc |
| --- | --- | --- | --- |
| split_cu_flag[x0][y0] | CtDepth[ xNbL ][ yNbL ] > cqtDepth | CtDepth[ xNbA ][ yNbA ] > cqtDepth | ( condL && availableL ) + ( condA && availableA ) |

Another syntax element, inter_pred_idc, indicates whether list0, list1, or bi-prediction is used for the current prediction unit. The syntax element has up to two bins, both of which are CABAC context coded. The binarized bin string is defined according to Table 9-36, copied from the HEVC standard, as follows where nPbW and nPbH represent the current luma prediction block width and height, respectively:

TABLE 9-36

Derivation of inter_pred_ic

| Value of inter_pred_idc | Bin string ( nPbW + nPbH ) != 12 | Bin string ( nPbW + nPbH ) == 12 |
| --- | --- | --- |
| 0 | 00 | 0 |
| 1 | 01 | 1 |
| 2 | 1 | — |

For each inter-coded slide (e.g., P or B slice), entropy encoding unit 118 may be configured to perform the above context selection derivation of the binarized bin string based on determining whether (nPbW+nPbH) !=12 or whether (nPbW+nPbH) !=12. For example, if (nPbW+nPbH) is not equal to 12, entropy encoding unit 118 may be configured to code the first bin using four contexts (e.g., 0, 1, 2, and 3) and code the second bin with one context. In some examples, the context selection of the first bin is according to the CU depth of the current block. In HEVC, CU depth is in the range of 0 to 3, inclusive. As another example, if (nPbW+nPbH) is equal to 12, entropy encoding unit 118 may be configured to code the first bin and the second bin with the same context as the context used by the second bin in the above example.

While entropy encoding unit 118 and entropy decoding unit 150 may be configured to perform one or more aspects of entropy coding in accordance with HEVC, as described above for example, there are a number of issues with the context modeling in HEVC. Context modeling in HEVC is specially designed for a CTU no larger than 64×64. Accordingly, when larger CTU sizes (e.g., 128×128, 256×256, or even larger) are used, directly reusing current context modeling processes, such as those described by HEVC, are less efficient or result in parsing issues.

As one example, when a CTU is larger than 64×64, directly reusing the current context modeling processes of split_cu_flag as defined by HEVC, is not efficient. As another example, when a CTU is larger than 64×64, the maximal CU depth is actually increased so that more contexts are needed for inter_pred_idc. However, additional contexts do not necessarily bring additional coding efficiency. Accordingly, some techniques in this disclosure relate to limiting the number of contexts, whereas other techniques in this disclosure relate to increasing the number of contexts.

This disclosure describes a number of different techniques, which are described in greater detail below, and which may overcome the issues associated with entropy coding of CTUs, as discussed above. These techniques may be used alone or in any combination. The following techniques may be applicable for coding large CTUs, as well as for coding 64×64 or smaller CTUs. The following techniques may be applied individually or in any combination.

In one example in accordance with the techniques of this disclosure, entropy encoding unit 118 may take into account the maximal and/or minimal CU depth information of the spatial and/or temporal neighbors of the current CU when performing the context modeling of split_cu_flag and/or a syntax element with the same semantics.

In this example, entropy encoding unit 118 may be configured to determine the possibility (e.g., probability or likelihood) of whether a CU is further split into sub-CUs based on the maximal and/or minimal CU depths or CU sizes of the spatial and/or temporal neighbors of the current CU, meaning the CU depths corresponding to all of the spatial and/or temporal neighbors of the current CU in some examples, and, one or more CU depths corresponding to one or more spatial and/or temporal neighbors of the current CU in other examples. Based on determining that the CU depth of the current CU is smaller than the minimal CU depth of one or more spatial and/or temporal neighbors of the current CU (e.g., all such neighbors), entropy encoding unit 118 may be configured to determine that it is very likely that the CU is to be split further. Based on determining that the CU depth of the current CU is larger than the maximal CU depth of one or more spatial and/or temporal neighbors of the current CU (e.g., all such neighbors), entropy encoding unit 118 may be configured to determine that it is very unlikely that the CU is to be split further.

In one example, entropy encoding unit 118 may be configured to use one dedicated context model to code the split_cu_flag syntax element upon determining that the current CU is very likely to be further split (e.g., when the CU depth of the current CU is smaller than the minimal CU depth of the spatial neighbors and/or temporal neighbors of the current CU). Alternatively or additionally, entropy encoding unit 118 may be configured to set the initial probability of the bin value equal to '1' associated with the context model to 1 or a value very close to 1. For example, with the initialization method introduced above, entropy encoding unit 118 may be configured to use a value of "0" (initVal=0) to initialize a context model to "very unlikely" (initState=1), and value "255" to initialize a context to "very likely" (initState=126).

In another example, entropy encoding unit 118 may be configured to use one dedicated context model to code the split_cu_flag syntax element upon determining that the current CU is very unlikely to be further split (e.g., when the CU depth of the current CU is larger than the maximum CU depth of the spatial neighbors and/or temporal neighbors of the current CU). Alternatively or additionally, entropy encoding unit 118 may be configured to set the initial probability of bin value equal to '1' associated with the context equal to 0 or a value very close to 0.

In some examples in accordance with the techniques of this disclosure, entropy encoding unit 118 may be configured to determine the context index offset based on uniform or non-uniform quantization of CU depth of the current CU for the inter_pred_idc syntax element rather than setting the context index offset equal to the CU depth. For example, entropy encoding unit 118 may be configured to set the context index offset to: min (CU depth, M), where M is a positive integer value and the min function returns the minimum value of two inputs. In some examples, entropy encoding unit 118 may set M equal to 3. Since each context index offset corresponds to a context, entropy encoding unit 118 may be configured to limit the number of contexts used for entropy encoding a CTU larger than 64×64 by limiting the context index offset as described above. For example, where M is 3, the number of contexts is limited to four. As another example, where M is 5, the number of contexts is limited to six.

The maximum CU size (the size of the CTU) and maximum CU split are usually signaled in a sequence parameter set (SPS) or picture parameter set (PPS). Video encoder 20 or video decoder 30 determines the CU size for a specific bitstream accordingly. In some examples in accordance with the techniques of this disclosure in which a CTU larger than 64×64 is enabled, video encoder 20 may subject the maximum and minimum CU sizes to additional constraints such that the CU depth is restricted with a certain range. Various examples of the CTU and CU size restrictions are now described. In some examples, one or more of the restrictions/constraints described below may only apply to inter coded CUs.

In one example, video encoder 20 may be configured to set the maximum CU size to be less than or equal to a size that is smaller than the allowed maximum CTU size. For example, the maximum CU size may be pre-defined, such as 64×64. By setting the maximum CU size less than or equal to a size that is smaller than the maximum CTU size, some modules of a video codec, such as adaptive loop filters, and sample adaptive offset processes, can be applied at the CTU level.

In another example, video encoder 20 may be configured to signal the maximum CU size together with CTU size and maximum CU depth in a PPS or any other high level syntax parameter set.

In another example, when the current CU has a size larger than the maximum CU size, video encoder 20 may be configured to not signal the split_cu_flag syntax element of the current CU. In such an example, video decoder 30 may be configured to infer split_cu_flag to be equal to 1.

Various examples of constraints on maximum CU size in accordance with the techniques of this disclosure are now described. In one example, video encoder 20 and video decoder 30 may restrict the CU depth to be smaller than M, where M is equal to 4 in some examples. In another example, video encoder 20 and video decoder 30 may restrict the CU size to be no smaller than (1<<(N−M)) where the largest CTU size is equal to (1<<N), "<<" is an arithmetic left shift, and M indicates the max CU depth (e.g., how many times a CTU can be further split). For example, M=4 means a CTU can be split 4 times. In one example, M may be set equal to 4. For example, a 64×64 CU having a CU depth of 4 may be first split into two 32×32 blocks, which may then be split into 16×16 blocks, which may then be split into 8×8 blocks, which may then be split into 4×4 blocks with the 4×4 blocks. This example demonstrates four exemplary CU depths (first 32×32, second at 16×16, third at 8×8, and fourth at 4×4). In some examples, the CU size constraint may be applied only to inter-coded CUs. In some examples, the maximum CU depth or minimum CU size for intra- and inter-coded CUs may be different.

In various examples in accordance with the techniques of this disclosure, entropy encoding unit 118 may add two additional contexts for coding the split_cu_flag or a syntax element with the same semantics. The first additional context indicates that a further split of the current CU has a high possibility (e.g., very likely). The second additional context indicates that a further split of the current CU has a low possibility (e.g., very unlikely). In these examples, entropy encoding unit 118 of video encoder 20 may be configured to define the maximal and minimal depths of the spatially neighboring (e.g., left, bottom-left, top and top-right) CUs of the current CU as max_depth and min_depth, respectively. Entropy encoding unit 118 may be configured to select the CABAC contexts for coding split_cu_flag according to the following pseudocode:

```
if (cur_cu_depth < max(0, min_depth-1) ) {Select the context
for further split with high possibility}
    else if (cur_cu_depth > min(g_max_cu_depth, max_depth+1))
{Select the context for further split with low possibility}
        else {Use the context selection of split_cu_flag in HEVC}
```

In the above pseudocode, cur_cu_depth indicates the CU depth of the current CU, and g_max_cu_depth denotes the maximal CU depth allowed in the bitstream. In one example, when a spatially neighboring CU is not available, video encoder 20 may be configured to set the neighboring CU depth equal to 0 when calculating min_depth, and may be configured to set the neighboring CU depth equal to g_max_cu_depth when calculating max_depth. In examples involving the two additional contexts, video encoder 20 may be configured to set the initial value (e.g., initVal described above) for the context of further split with high possibility to 255. In such examples, video encoder 20 may set the initial value (e.g., initVal described above) for the context of further split with low possibility to 0.

For CTUs larger than 64×64, the CU depth may be larger than 3. For example, when a CTU has size 256×256, CU depth may be 0, 1, 2, 3, 4, or 5. In some examples, entropy encoding unit 118 may still use four contexts (e.g., 0, 1, 2, and 3) for the first bin of inter_pred_idc. Entropy encoding unit 118 may then select the context using min(3, cur_cu_depth) where cur_cu_depth indicates the CU depth of the current CU.

FIG. 3 is a block diagram illustrating an example video decoder 30 that is configured to implement the techniques of this disclosure. FIG. 3 is provided for purposes of explanation and is not limiting on the techniques as broadly exemplified and described in this disclosure. For purposes of explanation, this disclosure describes video decoder 30 in the context of HEVC coding. However, the techniques of this disclosure may be applicable to other coding standards or methods.

Video decoder 30 represents an example of a device that may be configured to perform techniques for efficiently coding CTUs and CUs in accordance with various examples described in this disclosure. For example, video decoder 30 may be configured to perform context-adaptive binary arithmetic coding (CABAC) context modeling of a syntax element associated with a coding unit (CU) based on at least one of information of a spatially-neighboring CU relative to the CU or a temporally-neighboring CU relative to the CU, and CABAC decode the syntax element based on the modeled context.

In another example, video decoder 30 may be configured to: in response to determining that a CTU size is greater than 64×64, determine a group of constraints comprising: a maximum CU depth and a minimum CU depth of the CTU, and decode the CTU based on at least some of the group of constraints.

In the example of FIG. 3, video decoder 30 includes an entropy decoding unit 150, video data memory 151, a prediction processing unit 152, an inverse quantization unit 154, an inverse transform processing unit 156, a reconstruction unit 158, a filter unit 160, and a decoded picture buffer 162. Prediction processing unit 152 includes a motion compensation unit 164 and an intra-prediction processing unit 166. In other examples, video decoder 30 may include more, fewer, or different functional components.

Video data memory 151 may store video data, such as an encoded video bitstream, to be decoded by the components of video decoder 30. The video data stored in video data memory 151 may be obtained, for example, from a computer-readable medium, e.g., from a local video source, such as a camera, via wired or wireless network communication of video data, or by accessing physical data storage media. Video data memory 151 may form a coded picture buffer (CPB) that stores encoded video data from an encoded video bitstream. Decoded picture buffer 162 may be a reference picture memory that stores reference video data for use in decoding video data by video decoder 30, e.g., in intra- or inter-coding modes. Video data memory 151 and decoded picture buffer 162 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 151 and decoded picture buffer 162 may be provided by the same memory device or separate memory devices. In various examples, video data memory 151 may be on-chip with other components of video decoder 30, or off-chip relative to those components.

A coded picture buffer (CPB) may receive and store encoded video data (e.g., NAL units) of a bitstream. Entropy decoding unit 150 may receive encoded video data (e.g., NAL units) from the CPB and parse the NAL units to decode syntax elements. Entropy decoding unit 150 may entropy decode entropy-encoded syntax elements in the NAL units. Prediction processing unit 152, inverse quantization unit 154, inverse transform processing unit 156, reconstruction unit 158, and filter unit 160 may generate decoded video data based on the syntax elements extracted from the bitstream. Entropy decoding unit 150 may perform a process generally reciprocal to that of entropy encoding unit 118 as described above.

The NAL units of the bitstream may include coded slice NAL units. As part of decoding the bitstream, entropy decoding unit 150 may extract and entropy decode syntax elements from the coded slice NAL units. Each of the coded slices may include a slice header and slice data. The slice header may contain syntax elements pertaining to a slice. The syntax elements in the slice header may include a syntax element that identifies a PPS associated with a picture that contains the slice.

In addition to decoding syntax elements from the bitstream, video decoder 30 may perform a reconstruction operation on a non-partitioned CU. To perform the reconstruction operation on a non-partitioned CU, video decoder 30 may perform a reconstruction operation on each TU of the CU. By performing the reconstruction operation for each TU of the CU, video decoder 30 may reconstruct residual blocks of the CU.

As part of performing a reconstruction operation on a TU of a CU, inverse quantization unit 154 may inverse quantize, i.e., de-quantize, coefficient blocks associated with the TU. Inverse quantization unit 154 may use a QP value associated with the CU of the TU to determine a degree of quantization and, likewise, a degree of inverse quantization for inverse quantization unit 154 to apply. That is, the compression ratio, i.e., the ratio of the number of bits used to represent original sequence and the compressed one, may be controlled by adjusting the value of the QP used when quantizing transform coefficients. The compression ratio may also depend on the method of entropy coding employed.

After inverse quantization unit 154 inverse quantizes a coefficient block, inverse transform processing unit 156 may apply one or more inverse transforms to the coefficient block in order to generate a residual block associated with the TU. For example, inverse transform processing unit 156 may apply an inverse DCT, an inverse integer transform, an inverse Karhunen-Loeve transform (KLT), an inverse rotational transform, an inverse directional transform, or another inverse transform to the coefficient block.

If a PU is encoded using intra prediction, intra-prediction processing unit 166 may perform intra prediction to generate predictive blocks for the PU. Intra-prediction processing unit 166 may use an intra prediction mode to generate the predictive luma, Cb and Cr blocks for the PU based on the prediction blocks of spatially-neighboring PUs. Intra-prediction processing unit 166 may determine the intra prediction mode for the PU based on one or more syntax elements decoded from the bitstream.

Prediction processing unit 152 may construct a first reference picture list (RefPicList0) and a second reference picture list (RefPicList1) based on syntax elements extracted from the bitstream. Furthermore, if a PU is encoded using inter prediction, entropy decoding unit 150 may extract motion information for the PU. Motion compensation unit 164 may determine, based on the motion information of the PU, one or more reference regions for the PU. Motion compensation unit 164 may generate, based on samples blocks at the one or more reference blocks for the PU, predictive luma, Cb and Cr blocks for the PU.

Reconstruction unit 158 may use the luma, Cb and Cr transform blocks associated with TUs of a CU and the predictive luma, Cb and Cr blocks of the PUs of the CU, i.e., either intra-prediction data or inter-prediction data, as applicable, to reconstruct the luma, Cb and Cr coding blocks of the CU. For example, reconstruction unit 158 may add samples of the luma, Cb and Cr transform blocks to corresponding samples of the predictive luma, Cb and Cr blocks to reconstruct the luma, Cb and Cr coding blocks of the CU.

Video decoder 30 may be configured to perform a process generally reciprocal to that of video encoder 20 described herein. Similarly, video encoder 20 may be configured to perform a process generally reciprocal to that of video decoder 30 described herein. For example, disclosure that video decoder 30 may be configured to decode an encoded syntax element in a bitstream likewise necessarily discloses that video encoder 20 may be configured to encode the syntax element into the bitstream.

As another example, entropy decoding unit 150 may be configured to perform a process generally reciprocal to that of entropy encoding unit 118 described herein. According to aspects of this disclosure, entropy decoding unit 150 may be configured to entropy decode any code words generated by entropy encoding unit 118.

Filter unit 160 may perform a deblocking operation to reduce blocking artifacts associated with the luma, Cb and Cr coding blocks of the CU. Video decoder 30 may store the luma, Cb and Cr coding blocks of the CU in decoded picture buffer 162. Decoded picture buffer 162 may provide reference pictures for subsequent motion compensation, intra prediction, and presentation on a display device, such as display device 32 of FIG. 1. For instance, video decoder 30 may perform, based on the luma, Cb, and Cr blocks in decoded picture buffer 162, intra prediction or inter prediction operations on PUs of other CUs.

Figure 4:
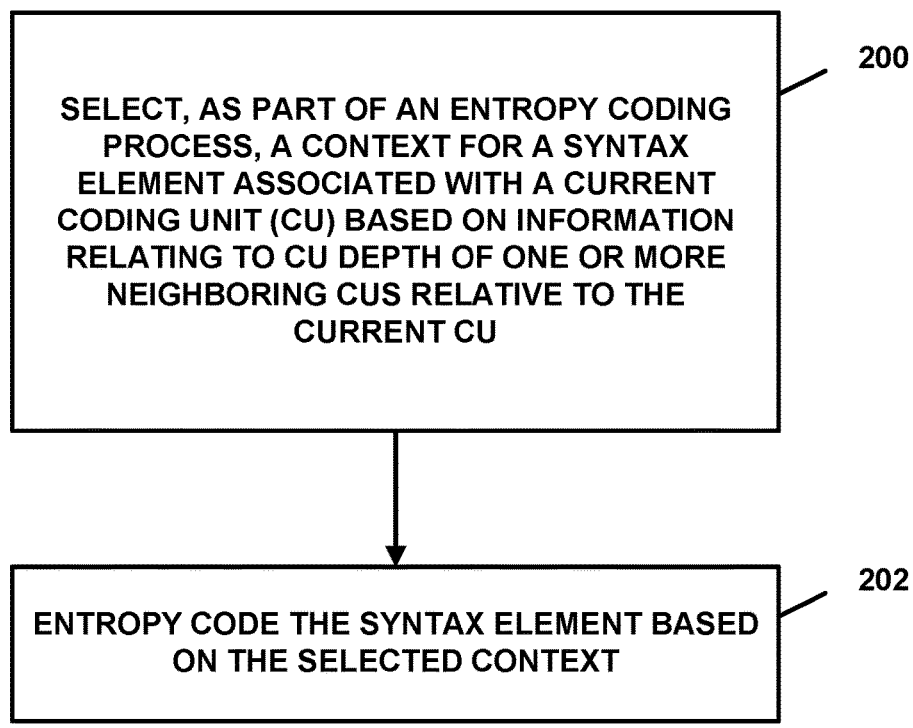
FIG. 4 is a flowchart illustrating an example process for coding video data consistent with techniques of this disclosure.

FIG. 4 is a flowchart illustrating an example process for coding (e.g., encoding and/or decoding) video data consistent with techniques of this disclosure. The process of FIG. 4 is generally described as being performed by a video coder for purposes of illustration, although a variety of other processors may also carry out the process shown in FIG. 4. As used herein, a video coder may refer to a video encoder and/or a video decoder, such as video encoder 20 and/or a video decoder 30 described with respect to FIGS. 1-3, for example. In some examples, video data memory 101, prediction processing unit 100, and/or entropy encoding unit 118 may perform one or more processes shown in FIG. 4. In some examples, video data memory 151, entropy decoding unit 150, and/or prediction processing unit 152 may perform one or more processes shown in FIG. 4.

In the example of FIG. 4, a video coder (e.g., video encoder 20 and/or video decoder 30) may be configured to select, as part of an entropy coding process, a context for a syntax element associated with a current coding unit (CU) based on information relating to CU depth of one or more neighboring CUs relative to the current CU (200). In some examples, the video coder may be configured to select the context for the syntax element based on information relating to CU depth of one or more spatially neighboring CUs relative to the current CU. In other examples, the video coder may be configured to select the context for the syntax element based on information relating to CU depth of one or more temporally neighboring CUs relative to the current CU. For example, one or more neighboring CUs relative to the current CU may be a spatial neighbor and/or one or more neighboring CUs relative to the current CU may be a temporal neighbor.

In some examples, the syntax element may represent whether the current CU is split into sub-CUs. In such examples, the syntax element may be the split_cu_flag syntax element. In some examples, a CTU associated with the current CU may have a size larger than 64×64.

In some examples, one or more CU depths relating to the one or more neighboring CUs may be equal and/or not equal to a CU depth of the current CU. For example, one or more CU depths relating to the one or more spatially-neighboring CUs may be equal to and/or not equal to a CU depth of the current CU. As another example, one or more CU depths relating to the one or more temporally-neighboring CUs may be equal to and/or not equal to a CU depth of the current CU.

The video coder may be configured to entropy code the syntax element based on the selected context (202). In some examples, the entropy coding process may comprise a context-adaptive binary arithmetic coding (CABAC) process, and the entropy coding may comprise CABAC coding. In such examples, CABAC coding may comprise CABAC encoding or CABAC decoding.

In some examples, the video coder may be configured to determine whether a CU depth of the current CU is smaller than a minimal CU depth of the one or more neighboring CUs. The video coder may be configured to select the context based on a determination that the CU depth of the current CU is smaller than the minimal CU depth of the one or more neighboring CUs. The video coder may be configured to set an initial value corresponding to the selected context equal to 255 based on the determination that the CU depth of the current CU is smaller than the minimal CU depth of the one or more neighboring CUs. The selected context may correspond to a probability value equal to one for the syntax element when the CU depth of the current CU is smaller than the minimal CU depth of the one or more neighboring CUs. In such examples, the selected context may comprise one of a dedicated context or an adaptive context with an initial value that is equal to or very close to one.

In some examples, the video coder may be configured to determine whether a CU depth of the current CU is greater than a maximum CU depth of the one or more neighboring CUs. The video coder may be configured to select the context based on a determination that the CU depth of the current CU is greater than the maximum CU depth of the one or more neighboring CUs. The video coder may be configured to set an initial value corresponding to the selected context equal to zero based on the determination that the CU depth of the current CU is greater than the maximum CU depth of the one or more neighboring CUs. The selected context may correspond to a probability value equal to zero for the syntax element when the CU depth of the current CU is greater than the maximum CU depth of the one or more neighboring CUs. In such examples, the selected context may comprise one of a dedicated context or an adaptive context with an initial value that is equal to or very close to zero.

In other examples, the video coder may be configured to select, as part of an entropy coding process, a context for a syntax element associated with a current coding unit (CU) based on at least one of information relating to CU depth of one or more spatially-neighboring CUs relative to the current CU or information relating to CU depth of one or more temporally-neighboring CUs relative to the current CU. In such examples, the video coder may be configured to determine whether a CU depth of the current CU is smaller than a minimal CU depth of at least one of the one or more spatially-neighboring CUs or the one or more temporally-neighboring CUs. The video coder may be configured to select the context based on a determination that the CU depth of the current CU is smaller than the minimal CU depth of the at least one of one or more spatially-neighboring CUs or one or more temporally-neighboring CUs. The video coder may be configured to set an initial value corresponding to the selected context equal to 255 based on the determination that the CU depth of the current CU is smaller than the minimal CU depth of the at least one of one or more spatially-neighboring CUs or one or more temporally-neighboring CUs.

In some examples, the selected context may correspond to a probability value equal to or very close to one for the syntax element when the CU depth of the current CU is smaller than the minimal CU depth of the at least one of one or more spatially-neighboring CUs or one or more temporally-neighboring CUs. In such examples, the selected context may comprise one of a dedicated context or an adaptive context with an initial value that is equal to or very close to one. In other examples, the selected context may correspond to a probability value equal to or very close zero for the syntax element when the CU depth of the current CU is greater than the maximum CU depth of the at least one of one or more spatially-neighboring CUs or one or more temporally-neighboring CUs. In such examples, the selected context may comprise one of a dedicated context or an adaptive context with an initial value that is equal to or very close to zero.

In some examples, the video coder may be configured to determine whether a CU depth of the current CU is greater than a maximum CU depth of at least one of the one or more spatially-neighboring CUs or the one or more temporally-neighboring CUs. The video coder may be configured to select the context based on a determination that the CU depth of the current CU is greater than the maximum CU depth of the at least one of one or more spatially-neighboring CUs or one or more temporally-neighboring CUs. The video coder may be configured to set an initial value corresponding to the selected context equal to zero based on the determination that the CU depth of the current CU is greater than the maximum CU depth of the at least one of one or more spatially-neighboring CUs or one or more temporally-neighboring CUs.

In some examples, the video coder may be configured to select context from a group of at least four possible contexts. In such examples, the group of at least four possible contexts comprises six possible contexts.

Figure 5:
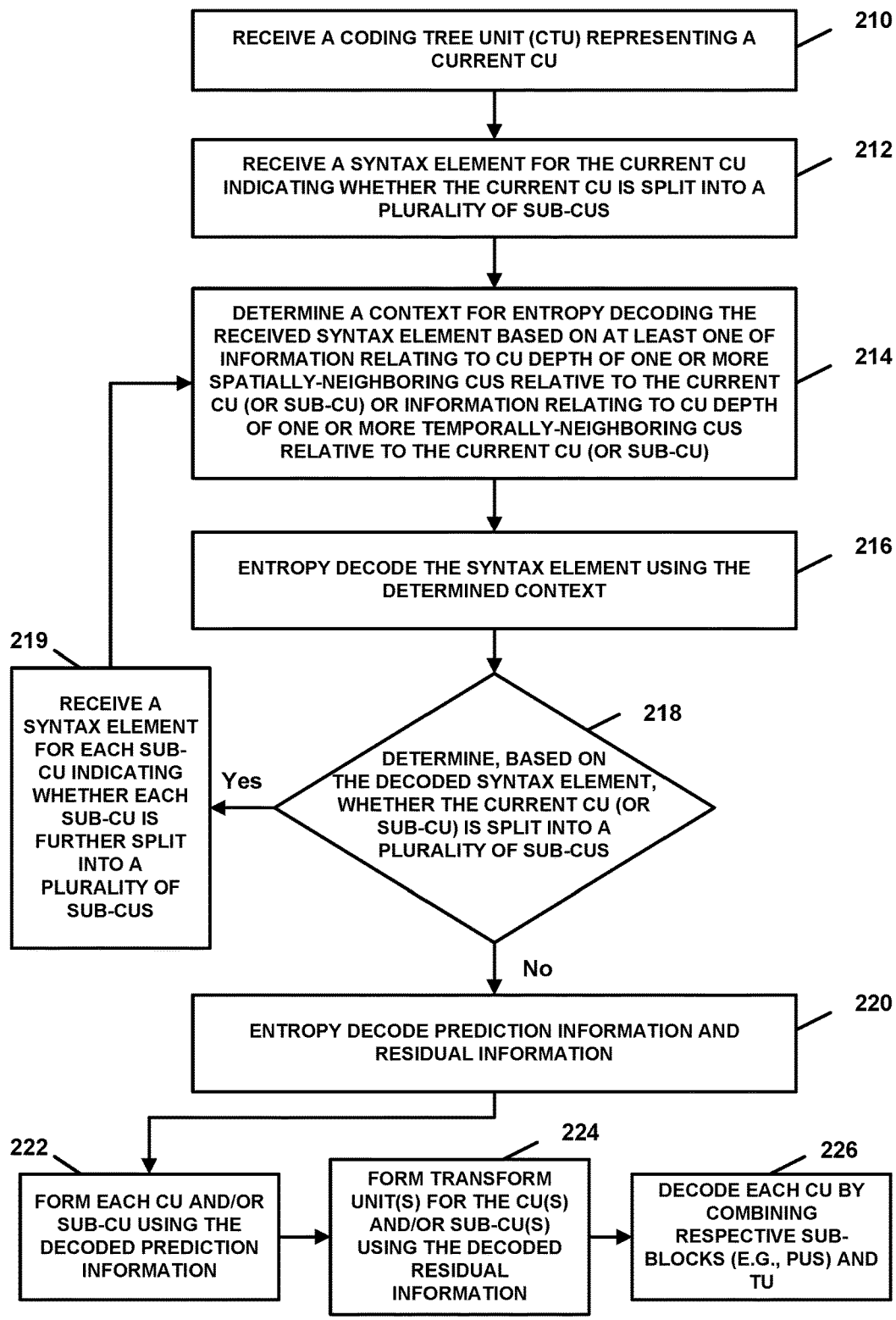
FIG. 5 is a flowchart illustrating an example process for decoding video data consistent with techniques of this disclosure.

FIG. 5 is a flowchart illustrating an example process for decoding video data consistent with techniques of this disclosure. The process of FIG. 5 is generally described as being performed by a video decoder (e.g., video decoder 30) for purposes of illustration, although a variety of other processors may also carry out the process shown in FIG. 5. In some examples, video data memory 151, entropy decoding unit 150, and/or prediction processing unit 152 may perform one or more processes shown in FIG. 5.

In the example of FIG. 5, video decoder 30 may be configured to receive a coding tree unit (CTU) representing a current CU (210). Video decoder 30 may be configured to receive a syntax element for the current CU indicating whether the current CU is split into a plurality of sub-CUs (212). In some examples, the syntax element may be a split_cu_flag syntax element. Video decoder 30 may be configured to determine a context for entropy decoding the received syntax element based on at least one of information relating to CU depth of one or more spatially-neighboring CUs relative to the current CU or information relating to CU depth of one or more temporally-neighboring CUs relative to the current CU (214). Video decoder 30 may be configured to entropy decode the syntax element using the determined context (216).

Video decoder 30 may be configured to determine, based on the decoded syntax element, whether the current CU is split into a plurality of sub-CUs (218). If the current CU is split into a plurality of CUs, video decoder 30 may be configured to receive a syntax element for each sub-CU indicating whether each sub-CU is further split into a plurality of sub-CUs (219). Video decoder 30 may be configured to determine a context for each syntax element for each sub-CU, and may be configured to entropy decode each syntax element for each sub-CU using each determined context for each syntax element as described with respect to blocks 214 and 216.

If video decoder 30 determines at block 218 that the current CU (or sub-CU) is not further split into a plurality of sub-CUs, then video decoder 30 may be configured to entropy decode prediction information and residual information (220). Video decoder 30 may be configured to form each CU and/or sub-CU (e.g., PU) using the decoded prediction information (222). Video decoder 30 may be configured to form transform unit(s) for the CU(s) and/or sub-CU(s) using the decoded residual information (224). Video decoder 30 may be configured to decode each CU by combining respective sub-blocks (e.g., PUs) and TUs (226).

Figure 6:
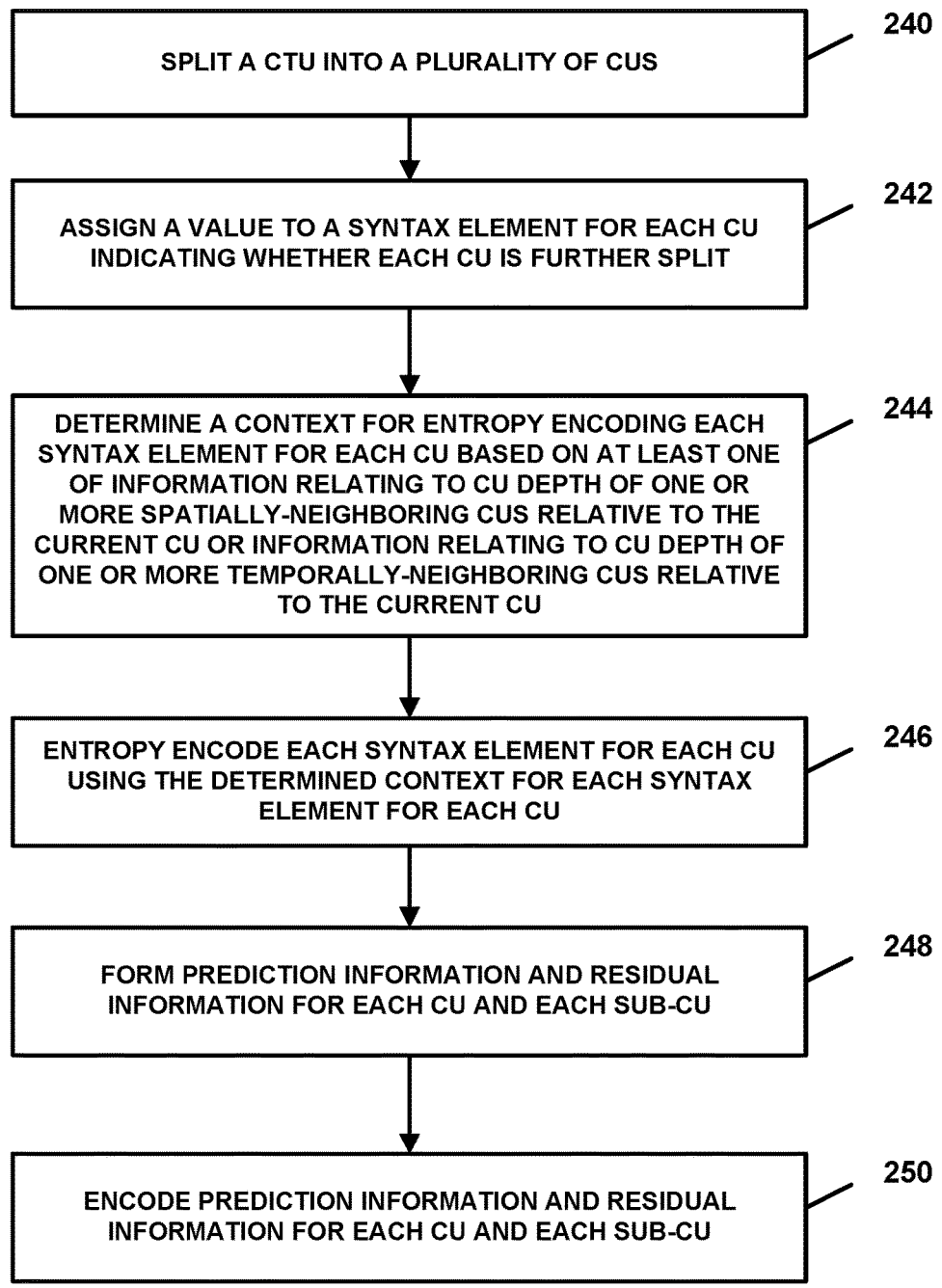
FIG. 6 is a flowchart illustrating an example process for encoding video data consistent with techniques of this disclosure.

FIG. 6 is a flowchart illustrating an example process for encoding video data consistent with techniques of this disclosure. The process of FIG. 6 is generally described as being performed by a video encoder (e.g., video encoder 20) for purposes of illustration, although a variety of other processors may also carry out the process shown in FIG. 6. In some examples, video data memory 101, prediction processing unit 100, and/or entropy encoding unit 118 may perform one or more processes shown in FIG. 6.

In the example of FIG. 6, video encoder 20 may be configured to split (e.g., partition) a CTU into a plurality of CUs (240). Video encoder 20 may be configured to assign a value to a syntax element for each CU indicating whether each CU is further split (242). In some examples, the syntax element for each CU may be a split_cu_flag syntax element. Video encoder 20 may be configured to determine a context for entropy encoding each syntax element for each CU based on at least one of information relating to CU depth of one or more spatially-neighboring CUs relative to the current CU (e.g., the CU with which the syntax element is associated) or information relating to CU depth of one or more temporally-neighboring CUs relative to the current CU (244). Video encoder 20 may be configured to entropy encode each syntax element for each CU using the determined context for each syntax element for each CU (246).

Video encoder 20 may be configured to form prediction information and residual information for each CU and each sub-CU (e.g., PU) (248). Video encoder 20 may be configured to encode prediction information and residual information for each CU and each sub-CU (250).

Example 1 a method of processing video data according to any of the techniques or any combination or permutation of the techniques disclosed herein.

Example 2 a method of coding video data, the method comprising: performing context-adaptive binary arithmetic coding (CABAC) context modeling of a syntax element associated with a coding unit (CU) based on at least one of information of a spatially-neighboring CU relative to the CU or a temporally-neighboring CU relative to the CU and CABAC coding the syntax element based on the modeled context.

Example 3 the method of example 2, wherein CABAC coding comprises CABAC encoding.

Example 4 the method of example 2, wherein CABAC coding comprises CABAC decoding.

Example 5

The method of any of examples 2-4, wherein the syntax element represents whether the CU is split into sub-CUs, and wherein CABAC coding comprises CABAC coding the syntax element based on a determination that the CU is likely to be split when a current CU depth is smaller than a minimal CU depth for the spatially-neighboring CU or the temporally-neighboring CU.

Example 6

The method of any of examples 2-5, wherein the syntax element represents whether the CU is split into sub-CUs, wherein CABAC coding comprises CABAC coding the syntax element using a context model that assigns a probability value equal to or very close to one for the syntax element when a current CU depth for the CU is smaller than a minimal CU depth for the spatially-neighboring CU or the temporally-neighboring CU, and wherein the context model comprises one of a dedicated context model or an adaptive context model with an initial value that is equal to or very close to one.

Example 7

The method of any of examples 2-6, wherein the syntax element represents whether the CU is split into sub-CUs, and wherein CABAC coding comprises CABAC coding the syntax element based on a determination that the CU is not likely to be split when a current CU depth is greater than a maximum CU depth for the spatially-neighboring CU or the temporally-neighboring CU.

Example 8

The method of any of examples 2-7, wherein the syntax element represents whether the CU is split into sub-CUs, wherein CABAC coding comprises CABAC coding the syntax element using a context model that assigns a probability value equal or very close to zero for the syntax element when a current CU depth for the CU is larger than a maximal CU depth for the spatially-neighboring CU or the temporally-neighboring CU, and wherein the context model comprises one of a dedicated context model or an adaptive context model with an initial value that is equal to or very close to zero.

Example 9 the method of any of examples 2-8, wherein the syntax element comprises the split_cu_flag syntax element.

Example 10 in response to determining that CU is not very likely to be split and in response to determining that the CU is not very unlikely to be split, performing the context modeling of the syntax element using context selection of the split_cu_flag as defined in HEVC.

Example 11 method of any of examples 2-10, further comprising, in response to determining the CU is likely to be split, setting a context associated with the CU being further split equal to 255, and in response to determining that the CU is not likely to be split, setting a context associated with the CU being unlikely to be split equal to 0.

Example 12

The method of any of examples 2-11, wherein a CTU associated with the CU has a size larger than 64×64, the method further comprising: using one of four possible contexts to model the syntax element.

Example 13

The method of example 12, further comprising selecting a context for CABAC coding the syntax element according to: min(3, cur_cu_depth), wherein cur_cu_depth indicates a current depth of the CU, and wherein min is a function that indicates a minimum of 3 and cur_cu_depth.

Example 14

The method of example 2, wherein the syntax element comprises inter_pred_idc, the method further comprising: determining a context index for inter_pred_idc based on whether quantization for the CU is uniform or non-uniform.

Example 15

The method of example 14, wherein the context index is equal to: min (CU depth, M), wherein CU depth is a depth of the CU, wherein M is a positive integer value, and wherein min is a function that returns a minimum of M and the CU depth.

Example 16 the method of example 15, wherein M is equal to 3.

Example 17

A method of coding video data, the method comprising: in response to determining that a CTU size is greater than 64×64, determining a group of constraints comprising: a maximum CU depth and a minimum CU depth of the CTU, and coding the CTU based on at least some of the group of constraints.

Example 18

The method of example 17, wherein the maximum CU depth is constrained to a size of 64×64.

Example 19 the method of any of examples 17-18, further comprising: coding a maximum CU size of the CTU, the CTU size, and the maximum CU depth in a parameter set.

Example 20

The method of any of examples 17-19, further comprising: in response to determining that a CU of the CTU has a size larger than a maximum CU size, inferring that a value of split_cu_flag is equal to one without coding the split_cu_flag element.

Example 21

The method of any of examples 17-20, wherein the maximum CU depth is less than a variable M.

Example 22

The method of any of examples 17-21, further comprising: restricting a CU size of the CTU to be no smaller than $(1<<(N-M))$, wherein the maximum CTU size is equal to $(1<<N)$, wherein N and M are integer values.

Example 23

The method of any of examples 17-22, wherein the constrained values apply only to inter-predicted CUs of the CTU.

Example 24

The method of any of examples 17-22, wherein at least one of the maximum CU size or the minimum CU is different for an intra-coded CU of the CTU, and an inter-coded CU of the CTU.

Example 25

The method of example 21, wherein M is equal to 4.

It should be understood that all of the techniques described herein may be used individually or in combination. This disclosure includes several signaling methods which may change depending on certain factors such as block size, palette size, slice type etc. Such variation in signaling or inferring the syntax elements may be known to the encoder and decoder a-priori or may be signaled explicitly in the video parameter set (VPS), sequence parameter set (SPS), picture parameter set (PPS), slice header, at a tile level or elsewhere.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially. In addition, while certain aspects of this disclosure are described as being performed by a single module or unit for purposes of clarity, it should be understood that the techniques of this disclosure may be performed by a combination of units or modules associated with a video coder.

Certain aspects of this disclosure have been described with respect to the developing HEVC standard for purposes of illustration. However, the techniques described in this disclosure may be useful for other video coding processes, including other standard or proprietary video coding processes not yet developed.

The techniques described above may be performed by video encoder 20 (FIGS. 1 and 2) and/or video decoder 30 (FIGS. 1 and 3), both of which may be generally referred to as a video coder. Likewise, video coding may refer to video encoding or video decoding, as applicable.

It should be understood that all of the techniques described herein may be used individually or in combination. For example, video encoder 20 and/or one or more components thereof and video decoder 30 and/or one or more components thereof may perform the techniques described in this disclosure in any combination. As another example, the techniques described herein may be performed by video encoder 20 (FIGS. 1 and 2) and/or video decoder 30 (FIGS. 1 and 3), both of which may be generally referred to as a video coder. Likewise, video coding may refer to video encoding or video decoding, as applicable.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially. In addition, while certain aspects of this disclosure are described as being performed by a single module or unit for purposes of clarity, it should be understood that the techniques of this disclosure may be performed by a combination of units or modules associated with a video coder.

Certain aspects of this disclosure have been described with respect to one or more video coding standards—whether released, under development, or the like—for purposes of illustration. However, the techniques described in this disclosure may be useful for other video coding processes, including other standard or proprietary video coding processes not yet developed.

In accordance with this disclosure, the term "or" may be interrupted as "and/or" where context does not dictate otherwise. Additionally, while phrases such as "one or more" or "at least one" or the like may have been used for some features disclosed herein but not others; the features for which such language was not used may be interpreted to have such a meaning implied where context does not dictate otherwise.

While particular combinations of various aspects of the techniques are described above, these combinations are provided merely to illustrate examples of the techniques described in this disclosure. Accordingly, the techniques of this disclosure should not be limited to these example combinations and may encompass any conceivable combination of the various aspects of the techniques described in this disclosure.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described herein. Any combination of the described systems, operations, functions, or examples is contemplated. These and other examples are within the scope of the following claims.

What is claimed is:

1. A method of coding video data, the method comprising:
   selecting, as part of an entropy coding process, a context for a bin of a syntax element associated with a current coding unit (CU) based on information relating to quantization of a CU depth of the current CU, wherein the syntax element represents whether the current CU is inter-predicted using only a first list, using only a second list, or is bi-predicted using both the first list and the second list; and
   entropy coding the syntax element based on the context selected for the bin.

2. The method of claim 1, wherein the entropy coding process comprises a context-adaptive binary arithmetic coding (CABAC) process, and wherein entropy coding the syntax element comprises CABAC coding the syntax element.

3. The method of claim 2, wherein CABAC coding comprises CABAC encoding the syntax element or CABAC decoding the syntax element.

4. The method of claim 1, wherein selecting the context for the bin based on the information relating to the quantization of the CU depth comprises selecting the context for the bin based on whether the CU depth of the current CU is quantized uniformly or is quantized non-uniformly.

5. The method of claim 1, wherein determining the context comprises determining the context using a context index offset value.

6. The method of claim 1, wherein the syntax element comprises an inter_pred_idc syntax element.

7. The method of claim 1,
wherein determining the context comprises determining the context by applying a min( ) function using the CU depth as a first input and a positive integer 'M' as a second input.

8. The method of claim 7, wherein 'M' has a value of three (3).

9. The method of claim 1, wherein the bin of the syntax element is a first bin of multiple bins of the syntax element.

10. The method of claim 1, wherein a CTU associated with the current CU has a size larger than 64×64.

11. The method of claim 1, wherein selecting the context comprises selecting a lesser value between the CU depth and three (3).

12. The method of claim 11, further comprising:
selecting the context from a group of four possible contexts.

13. A device for coding video data, the device comprising:
a memory configured to store the video data; and
processing circuitry in communication with the memory, the processing circuitry being configured to:
select, as part of an entropy coding process, a context for a bin of a syntax element associated with a current coding unit (CU) stored in the memory based on information relating to quantization of a CU depth of the current CU, wherein the syntax element represents whether the current CU is inter-predicted using only a first list, using only a second list, or is bi-predicted using both the first list and the second list; and
entropy code the syntax element based on the context selected for the bin.

14. A non-transitory computer-readable storage medium having instructions stored that, when executed, cause one or more processors to:
select, as part of an entropy coding process, a context for a bin of a syntax element associated with a current coding unit (CU) based on information relating to quantization of a CU depth of the current CU, wherein the syntax element represents whether the current CU is inter-predicted using only a first list, using only a second list, or is bi-predicted using both the first list and the second list; and
entropy code the syntax element based on the context selected for the bin.

15. The device of claim 13, wherein to select the context for the bin based on the information relating to the quantization of the CU depth, the processing circuitry is configured to select the context for the bin based on whether the CU depth of the current CU is quantized uniformly or is quantized non-uniformly.

16. The device of claim 13, wherein to determine the context, the processing circuitry is configured to determine the context using a context index offset value.

17. The device of claim 13, wherein the syntax element comprises an inter_pred_idc syntax element.

18. The device of claim 13, wherein to determine the context, the processing circuitry is configured to apply a min( ) function using the CU depth as a first input and a positive integer 'M' as a second input.

19. The device of claim 18, wherein 'M' has a value of three (3).

* * * * *